United States Patent
May et al.

(10) Patent No.: US 9,596,865 B2
(45) Date of Patent: Mar. 21, 2017

(54) AUTOMATED PACKAGING SYSTEMS WITH ELECTRIC MOTOR DRIVEN ACTUATORS FOR COMPRESSION OF TARGET PRODUCT

(71) Applicant: Tipper Tie, Inc., Apex, NC (US)

(72) Inventors: Dennis J. May, Pittsboro, NC (US); William M. Poteat, Fuquay-Varina, NC (US); Samuel D. Griggs, Raleigh, NC (US); Kim L. Poling, Fuquay-Varina, NC (US); Derek L. Brown, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 372 days.

(21) Appl. No.: 14/189,092

(22) Filed: Feb. 25, 2014

(65) Prior Publication Data

US 2014/0256239 A1    Sep. 11, 2014

Related U.S. Application Data

(60) Provisional application No. 61/776,216, filed on Mar. 11, 2013.

(51) Int. Cl.
*A22C 11/00* (2006.01)
*A22C 11/02* (2006.01)
(Continued)

(52) U.S. Cl.
CPC ............ *A22C 11/02* (2013.01); *A22C 11/005* (2013.01); *B65B 25/06* (2013.01); *B65B 25/065* (2013.01);
(Continued)

(58) Field of Classification Search
CPC ... A22C 11/00; A22C 11/005; A22C 11/0209; A22C 11/02; A22C 11/006; A22C 11/0245
(Continued)

(56) References Cited

U.S. PATENT DOCUMENTS

| 1,218,314 A | 3/1917 | Read |
| 2,029,984 A | 2/1936 | Buttfield et al. |

(Continued)

FOREIGN PATENT DOCUMENTS

| EP | 0930236 | 7/1999 |
| WO | WO 99/16670 | 4/1999 |
| WO | WO 2011/033931 | 3/2011 |

OTHER PUBLICATIONS

GSX Series Electric Linear Actuators, Product Description, http://www.exlar.com/product_lines/1-GSX-Series-Motor-Actuators, Printed from the internet Mar. 8, 2013, date unknown but for the purposes of examination believed to be prior to the priority date of the present application, 2 pages.
(Continued)

*Primary Examiner* — Richard Price, Jr.
(74) *Attorney, Agent, or Firm* — Christensen O'Connor Johnson Kindness PLLC

(57) ABSTRACT

Methods, systems, apparatus, devices and computer program products automatically package an object, such as, for example, whole muscle meat pieces, in a covering material, such as, for example, sheared casing and/or netting. The devices include an automated compression assembly with an electric drive motor and a pusher assembly with an electric motor, preferably each electric motor is a servo-motor. The systems/apparatus devices can include a programmably adjustable index and/or speed profile for the compression and/or pusher assembly.

20 Claims, 16 Drawing Sheets

(51) Int. Cl.
*B65B 25/06* (2006.01)
*B65B 51/04* (2006.01)
*B65B 63/02* (2006.01)

(52) U.S. Cl.
CPC .............. *B65B 51/04* (2013.01); *B65B 63/02* (2013.01); *B65B 63/026* (2013.01)

(58) Field of Classification Search
USPC ........................................ 452/30–32, 35, 37
See application file for complete search history.

(56) References Cited

U.S. PATENT DOCUMENTS

| | | | |
|---|---|---|---|
| 2,778,077 A | 1/1957 | Andrews et al. | |
| 2,847,810 A | 8/1958 | Davey et al. | |
| 3,040,654 A | 6/1962 | John | |
| 3,389,533 A | 6/1968 | Tipper et al. | |
| 3,447,482 A | 6/1969 | Jones | |
| 3,455,084 A | 7/1969 | Broersma et al. | |
| 3,499,259 A | 3/1970 | Tipper et al. | |
| 3,524,297 A | 8/1970 | Pedersen et al. | |
| 3,548,890 A | 12/1970 | Langen | |
| 3,815,323 A | 6/1974 | Longo | |
| 3,854,391 A | 12/1974 | Ackroyd | |
| 3,892,168 A | 7/1975 | Grobman | |
| 3,949,864 A | 4/1976 | Montsant | |
| 4,036,124 A | 7/1977 | Seiler et al. | |
| 4,086,850 A | 5/1978 | Becker et al. | |
| 4,205,604 A | 6/1980 | Ashley | |
| 4,371,554 A * | 2/1983 | Becker ................. | A22C 11/001 134/1 |
| 4,466,532 A | 8/1984 | Minneman et al. | |
| 4,474,284 A | 10/1984 | Powell | |
| 4,505,003 A | 3/1985 | Becker et al. | |
| 4,516,387 A | 5/1985 | Kupcikevicius | |
| 4,537,006 A | 8/1985 | Pieri | |
| 4,590,748 A | 5/1986 | Harrison et al. | |
| 4,602,472 A | 7/1986 | Ampolini et al. | |
| 4,683,700 A | 8/1987 | Evans et al. | |
| 4,763,777 A | 8/1988 | Hooper et al. | |
| 4,833,863 A | 5/1989 | Scott et al. | |
| 5,042,234 A | 8/1991 | Evans et al. | |
| 5,044,144 A | 9/1991 | Foote et al. | |
| 5,092,449 A | 3/1992 | Bolin | |
| 5,161,347 A | 11/1992 | May et al. | |
| 5,202,135 A | 4/1993 | Yawn | |
| 5,381,725 A | 1/1995 | Breunig et al. | |
| 5,519,985 A | 5/1996 | Dyck et al. | |
| 5,630,697 A | 5/1997 | Black, Jr. | |
| 5,730,277 A | 3/1998 | Meinke et al. | |
| 6,135,869 A * | 10/2000 | Schutz ..................... | B65B 9/12 452/32 |
| 6,637,178 B1 | 10/2003 | Cook et al. | |
| 6,637,584 B2 | 10/2003 | Takahashi et al. | |
| 6,645,062 B1 * | 11/2003 | Buckles ................. | A22C 7/00 452/30 |
| 6,729,102 B2 | 5/2004 | Ailey et al. | |
| 6,883,297 B2 | 4/2005 | Kirk et al. | |
| 6,976,346 B2 | 12/2005 | May et al. | |
| 7,073,365 B2 | 7/2006 | Geho et al. | |
| 7,182,683 B2 * | 2/2007 | Shefet .................. | A22C 11/001 452/30 |
| 7,237,369 B2 | 7/2007 | Griggs et al. | |
| 7,290,648 B2 | 11/2007 | Buonomo | |
| 7,313,896 B2 | 1/2008 | Griggs et al. | |
| 7,314,405 B2 * | 1/2008 | Florindo ................ | A22C 11/04 452/31 |
| 7,392,635 B2 | 7/2008 | May et al. | |
| 7,520,107 B2 | 4/2009 | Griggs et al. | |
| 7,520,801 B2 * | 4/2009 | Epstein ................ | A22C 7/0023 452/30 |
| 7,870,707 B2 | 1/2011 | May et al. | |
| 7,925,379 B2 | 4/2011 | May et al. | |
| 7,966,714 B2 | 6/2011 | Dick et al. | |
| 7,975,454 B2 | 7/2011 | May et al. | |
| 8,011,167 B2 | 9/2011 | Griggs et al. | |
| 8,100,066 B2 | 1/2012 | Stein | |
| 8,209,945 B2 | 7/2012 | May et al. | |
| 8,256,191 B2 | 9/2012 | Griggs et al. | |
| 8,261,516 B2 | 9/2012 | Laplace | |
| 8,950,573 B2 | 2/2015 | Poteat et al. | |
| 8,950,574 B2 | 2/2015 | May et al. | |
| 9,411,322 B2 | 8/2016 | May et al. | |
| 2003/0131564 A1 | 7/2003 | Ailey, Jr. et al. | |
| 2005/0034426 A1 | 2/2005 | Griggs et al. | |
| 2006/0021292 A1 | 2/2006 | Norton et al. | |
| 2006/0105690 A1 | 5/2006 | Wince et al. | |
| 2006/0277868 A1 | 12/2006 | May et al. | |
| 2008/0000196 A1 | 1/2008 | May et al. | |
| 2008/0236103 A1 | 10/2008 | Lowder et al. | |
| 2008/0250755 A1 | 10/2008 | Griggs et al. | |
| 2010/0101187 A1 | 4/2010 | Laplace | |
| 2010/0162668 A1 | 7/2010 | Cain | |
| 2010/0287883 A1 | 11/2010 | May et al. | |
| 2013/0291485 A1 | 11/2013 | McCorkle | |
| 2014/0048170 A1 | 2/2014 | Evans | |
| 2015/0035460 A1 | 2/2015 | Poteat et al. | |

OTHER PUBLICATIONS

Supplemental European Search Report and Communication for related European Application No. EP12811892.4, dated Mar. 10, 2015, 11 pages.
International Search Report and Written Opinion for related PCT Application No. PCT/US2012/046167, date of mailing Jan. 29, 2013.
European Search Report for related European Application No. EP12811892, date mailed Nov. 28, 2014, 6 pages.
Supplemental European Search Report and Communication for corresponding European Application No. EP14158485.4, dated Jul. 22, 2014, 4 pages.
Preliminary Amendment filed in corresponding, unpublished U.S. Appl. No. 15/203,510 (dated Jul. 25, 2016) (7 pages).

* cited by examiner

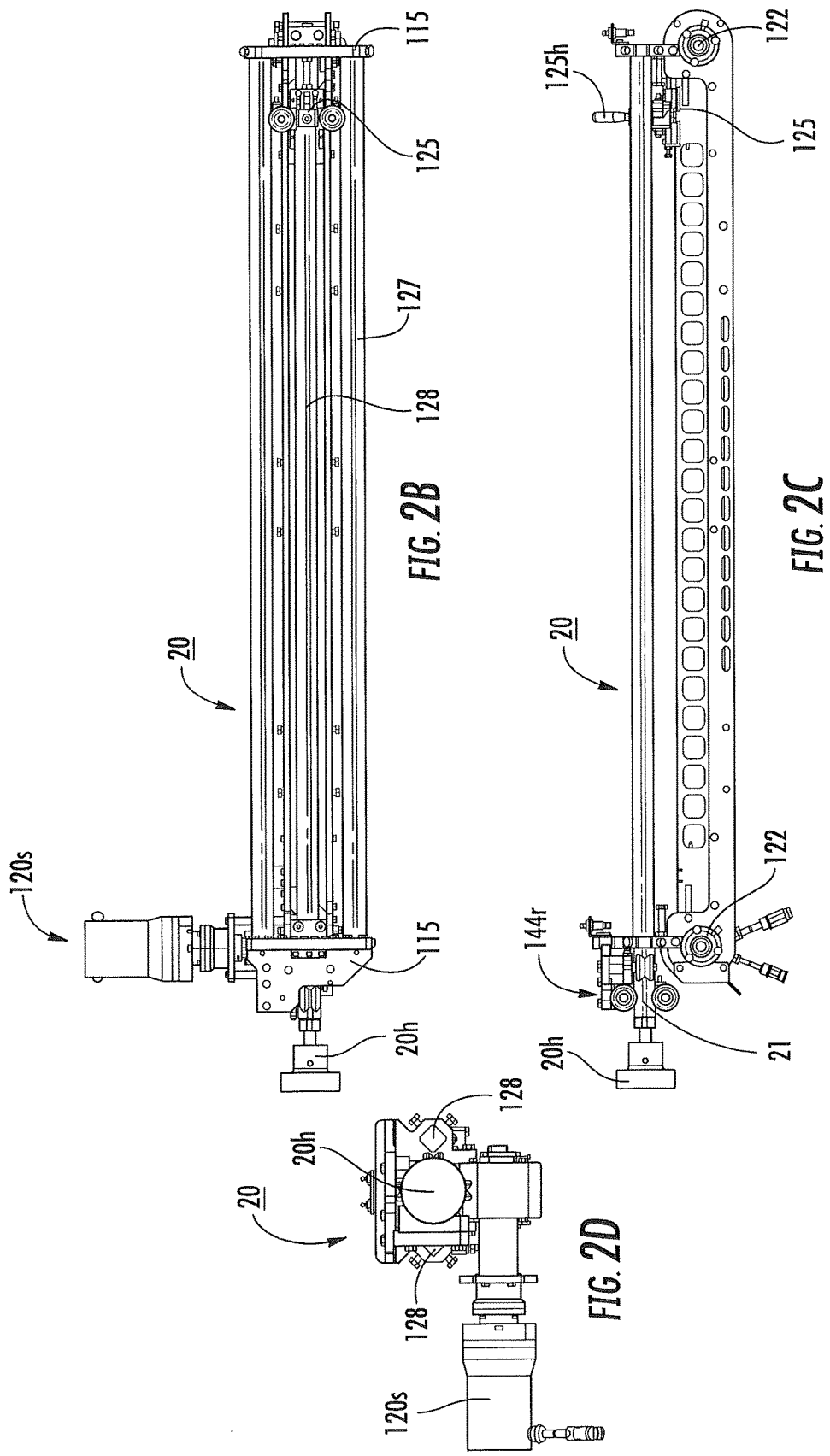

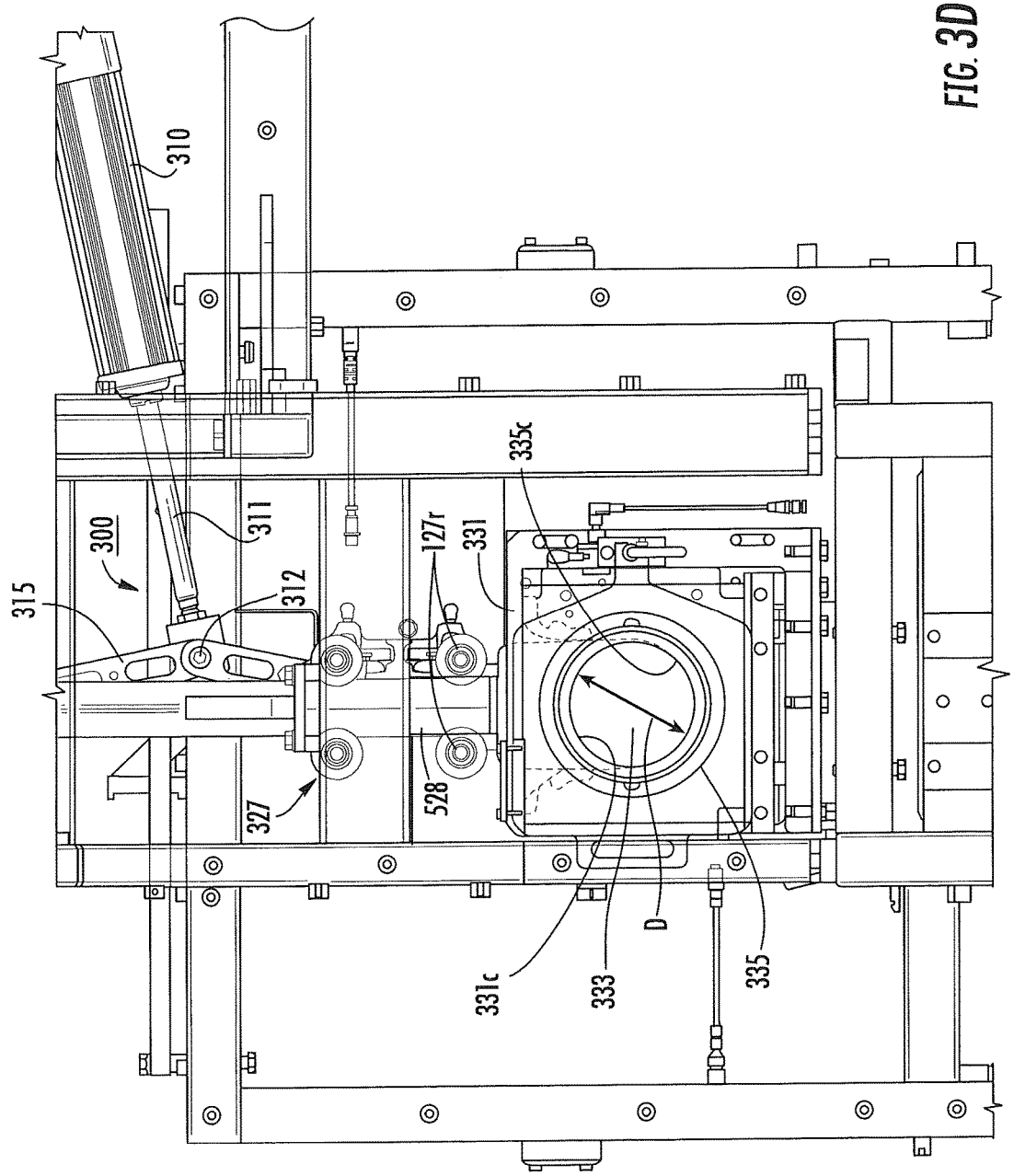

AUTOMATED PACKAGING SYSTEMS WITH ELECTRIC MOTOR DRIVEN ACTUATORS FOR COMPRESSION OF TARGET PRODUCT

RELATED APPLICATIONS

This application claims the benefit of and priority to U.S. Provisional Application Ser. No. 61/776,216, filed Mar. 11, 2013, the contents of which are hereby incorporated by reference as if recited in full herein.

FIELD OF THE INVENTION

The present invention relates to apparatus that can package materials that enclose products therein, and may be particularly suitable for enclosing discrete pieces of whole muscle in clipped casing.

BACKGROUND OF THE INVENTION

Certain types of commodity and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of discrete or integrated (e.g., compressed) goods in a single package. The covering material can be any suitable material, typically a casing and/or netting material.

For example, the systems may include a chute that holds a length of sheared casing and/or a netting sleeve over the exterior thereof. The leading and trailing edges of the casing and/or netting can be gathered and clipped, typically using single or double clippers. Clipping mechanisms or "clippers" are well known to those of skill in the art and include those available from Tipper Tie, Inc., of Apex, N.C., including product number Z4288. Examples of clip attachment apparatus and/or packaging apparatus are described in U.S. Pat. Nos. 3,389,533; 3,499,259; 4,683,700; and 5,161,347, and U.S. Patent Application Publication No. 2008/0000196, the contents of which are hereby incorporated by reference as if recited in full herein.

SUMMARY OF EMBODIMENTS OF THE INVENTION

Embodiments of the present invention provide electric motor driven compression sections, and related apparatus, subassemblies and/or other devices, systems, methods and computer program products for packaging target product.

Some embodiments of the invention are directed to methods, systems and devices that can automatically or semi-automatically compress and package a whole muscle product in a covering material and apply clips thereto.

The electric motor(s) is typically a servo-motor, but can comprise other electric motor drive technologies and linear drive elements, e.g., stepper motors, an AC motor with VFD (variable frequency drive), an induction motor with a feedback encoder and a VFD drive, ball screws, chain drives and rack and pinion drives.

The system can also include a controller configured to define a compression speed profile that decelerates the compression member to a slower speed at a forward end portion of a stroke cycle. The speed profile may define a fast reset speed (faster than the speed(s) during the extension/forward stroke) to return the compression member to the retracted position.

Embodiments of the invention are directed to packaging systems that include: (a): a frame supported by a floor; (b) a lower breech chute member attached to the frame, the lower breech chute member having an elongate axially extending arcuate cavity; (c) an electric motor attached to the frame and residing above the lower breech chute member; and (d) an upper breech chute member with an elongate axially extending arcuate cavity in communication with the electric motor. The upper breech chute is a breech press configured to controllably travel from a lockable home position above the lower breech chute member to at least one lower operative position to engage the lower breech chute member and define a substantially cylindrical enclosed chamber of a substantially fixed diameter.

The electric motor can be a servo-motor in communication with an actuator. The actuator can be attached to a linkage assembly that is attached to the upper breech chute member.

The system can include a controller in communication with the motor configured to define an adjustable speed and/or acceleration profile of a stroke cycle of the upper breech chute member and the pusher assembly.

The electric motor can be a servo-motor. The system can also include a pair of scissor linkages with upper and lower linkages, the upper linkages having upper end portions that are pivotably attached to an upper portion of the frame, the lower linkages having lower end portions that are pivotably attached to the upper breech chute member. The lower end portions of the upper linkages can be pivotably attached to upper end portions of the lower linkages. The system can also include a laterally extending rod attached to the scissor linkages and an actuation rod driven by and extending outward from the electric motor with a front end portion attached to the laterally extending rod.

The system can also include at least one vertically extending rail residing above the lower breech chute member, and at least one guide member attached to the upper breech chute member configured to engage the rail to thereby guide the upper member up and down between home and operative positions.

Where used, the at least one vertically extending rail includes first and second longitudinally spaced apart rails, one residing proximate each opposing longitudinally spaced apart end portion of the lower breech chute member.

The system can include first and second roller assemblies configured to travel against a respective rail as the upper breech chute member travels up and down.

The roller assemblies can include food grade rollers.

The rollers can be "V" shaped rollers:

The roller assemblies can include pairs of spaced apart rollers that face each other across a width of the rail and cooperate to travel up and down a respective rail in concert.

The upper breech chute member can releasably attach to a mounting plate. The lower breech chute can releasably attach to the frame to lock and unlock in position with a front lock attached to the frame and a pair of mounting members with internally facing lips that slidably engage opposing end portions of the lower breech member chute. The mounting plate and frame can be configured to respectively interchangeably accept different pairs of upper and lower breech chute members to define different fixed diameter size enclosed breech cavities to produce different fixed diameter size products.

The mounting plate can include first and second longitudinally spaced apart release mounts extending downward that are releasably attached to a medially positioned, longitudinally extending segment of the upper breech chute member and a pair of longitudinally spaced apart bearing mounts attached to the mounting plate and extending above the mounting plate.

The system can include a pair of scissor linkages with respective upper and lower linkages. The upper linkages having upper end portions that are pivotably attached to an upper portion of the frame, the lower linkages having lower end portions that are pivotably attached to the bearing mounts of the mounting plate, and with lower end portions of the upper linkages pivotably attached to upper end portions of the lower linkages. The system can also include a laterally extending rod attached to the scissor linkages and an actuation rod extending outward from the electric motor with a front end portion attached to the laterally extending rod.

Other embodiments are directed to methods of compressing target food product. The methods include: (a) electronically directing an electric motor to move an upper breech chute member vertically straight downward from a detached position above and spaced apart from a cooperating lower breech chute member to engage the lower breech chute member; then (b) automatically compressing target product in the enclosed cavity using the upper breech chute member controlled by the electric drive motor to form a substantially cylindrical compressed target product in an enclosed cavity between the upper and lower breech members.

The electric drive motor of the upper breech member can be a servo-motor, the method further comprising programmatically adjusting a speed profile associated with the servo-motor.

The upper and lower breech chute members can attach together to define a food-grade cleanliness cylindrical cavity.

The electric drive motor can be attached to an elongate actuation rod that extends outward therefrom, the actuation rod having an end portion attached to a linkage assembly, the linkage assembly attached to the upper breech chute member, wherein the electronically directing step is carried out by the electric motor extending the actuation rod to extend links of the linkage assembly that lower the upper breech chute member.

The upper breech chute member can be attached to first and second spaced apart guide assemblies that travel about vertical rails. The method can include guiding the straight downward movement of the upper breech chute member using the rails.

The method can include programmatically directing the upper chute member to travel down to overcompress the target product in the enclosed cavity beyond a round shape, then reducing pressure to form a fixed diameter cylindrical product before advancing the pusher shaft.

The target product can be uncooked whole boneless loins.

The target product can be uncooked whole boneless beef loins and the compressing step can apply between about 10,000 lbf to about 14,000 lbf to the beef loins.

Still other embodiments are directed to computer program products for operating an automated or semi-automated packaging systems. The computer program product includes a non-transitory computer readable storage medium having computer readable program code embodied in the medium. The computer-readable program code including computer readable program code that directs a servo-motor to drive an actuation rod to move a compression member through an adjustable compression stroke cycle. The adjustable compression stroke cycle can adjust acceleration, speed and timing of speed change or acceleration over a respective stroke cycle.

Still other embodiments are directed to computer program products for operating an automated or semi-automated packaging system. The computer program products include a non-transitory computer readable storage medium having computer readable program code embodied in the medium. The computer-readable program code includes computer readable program code that directs an electric motor to drive an actuation rod to drive the compression member through an adjustable compression stroke cycle.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 2B is top view of a pusher assembly similar to that shown in FIG. 2A but with an alternative orientation of the motor and drive elements according to embodiments of the present invention.

FIG. 2C is a side view of the pusher assembly shown in FIG. 2B.

FIG. 2D is an end view of the pusher assembly shown in FIGS. 2B and 2C.

FIG. 3D is an enlarged end view shown in FIG. 3A, but illustrating the breech press in an extended position over the bottom breech chute member according to embodiments of the present invention.

DESCRIPTION OF EMBODIMENTS OF THE INVENTION

Figure 1:
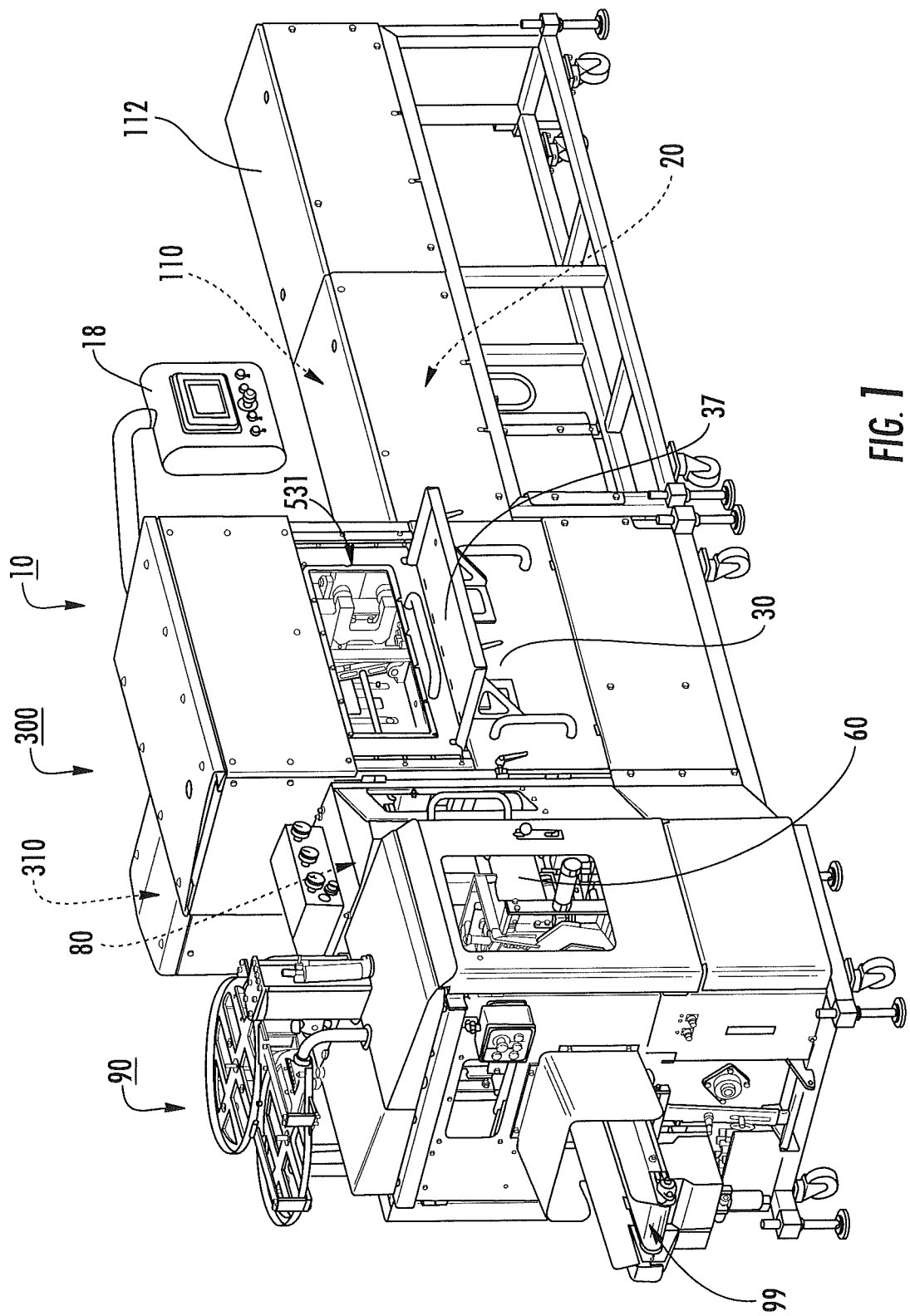
FIG. 1 is a side perspective discharge end view of an apparatus/system with an electric motor driven "breech" compression system according to embodiments of the present invention

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims or figures unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The term "about" means that the value can vary by +/−20% from the stated number.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

In the description of embodiments of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

The term "frame" means a generally skeletal structure used to support one or more assemblies, modules and/or components. The frame may be one integral structure or a plurality of individual structures mountable to each other or a common floor structure or the like. The term "modular" means that a subassembly is designed with standardized dimensions, mounting features and/or configurations for interchangeable use with replacement modules of the same or similar type and/or other selected different modules. The term "module" can refer to a physical assembly or subassembly that includes certain components, features or devices that carry out specified functions. However, the term "module" when used with respect to a controller or computer operation, refers to a circuit that includes software (e.g., computer program code) only or software and hardware components.

The term "breech chute" refers to a chute that is configured to allow for a top, side and/or lateral loading path or entry of a target product.

The term "electric motor" refers to DC or AC motors, including servo-motors. The electric motor-drive systems are in contrast to conventional pneumatic actuation drives.

The electric motor based drive system can comprise other motor drive technologies and linear drive elements, e.g., stepper motors, an AC motor with VFD (variable frequency drive), an induction motor with a feedback encoder and a VFD drive, ball screws, chain drives and rack and pinion drives and the like. In a preferred embodiment, the electric motor is a servo-motor. The servo-motor may operate using motor feedback in a control system. This feedback can be used to detect unwanted motion, adjust speed and/or to monitor the accuracy of the commanded motion. The feedback can be provided by an encoder or sensor.

The term "servo-drive" refers to a drive system that controls the servo-motor. Generally stated, the servo-drive transmits electric current to the servo-motor in order to produce motion proportional to the command signal. A command signal can represent a desired velocity, acceleration or deceleration, but can also represent a desired torque or position. The servo-motor can have one or more sensors that report the motor's actual status back to the servo-drive. The servo-drive can adjust the voltage frequency and/or pulse width to the motor so as to correct for deviation or drift and the like.

Embodiments of the present invention are particularly suitable for devices that cooperate with clippers to apply closure clips to objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Optionally, sheared casing and/or netting or other covering material may be used to package discrete meat products such as loaves of meat raw, partially or even totally cooked or other meat or items. Other embodiments of the present invention may package other types of food as well as non-food items. Examples of non-food items that may be packaged using embodiments of the present invention include dirt, sand and mulch, as well as inanimate objects. Additional examples of products include discrete, or semi-solid or solid material such as pet food. The product may be packaged for any suitable industry including horticulture, aquaculture, agriculture, or other food industry, environmental, chemical, explosive, or other application. Sheared casing and/or netting may be useful to package whole muscle (uncooked meat), whole beef tenderloin, ham or turkeys.

Generally stated, some particular embodiments of the present invention are directed at automating the packaging of discrete pieces of whole muscle (animal) meat food product by compressing the whole muscle pieces into a single round product. The compressed round product can then optionally be automatically pushed through a product chute and wrapped or enveloped in a covering material such as casing and/or netting (e.g., "open net", so that the whole muscle therein is exposed to environmental conditions), then automatically or semi-automatically clipping the covering material with a closure clip or other attachment means to close the covering and hold the compressed product inside of the covering material.

Optionally, if desired, the packaging systems can include a collagen food film forming module that forms a tubular protein layer over compressed whole muscle (e.g., COFFI material sold by Naturin) or other thin covering that is then covered by a netting, which is also optional (as is a netting chute for providing same).

The compressed whole muscle may be in a single package or may be packaged in a series of linked packages. The whole muscle may be processed so that protein migrates to or resides proximate an outer surface so that adjacent pieces of whole muscle may combine, attach, and/or bind when held in the covering (e.g., casing and/or netting) during subsequent processing.

In some embodiments, whole muscle pieces can be compressed and packaged together in the electric motor driven actuator of a compression chamber inside the casing and/or netting.

Where linked, the space between the actual product can have sufficient length to allow exposure (non-contact between adjacent netted product links) of adjacent ends of the packaged whole muscle to processing conditions (such as smoke from a smoker).

Figure 2A:
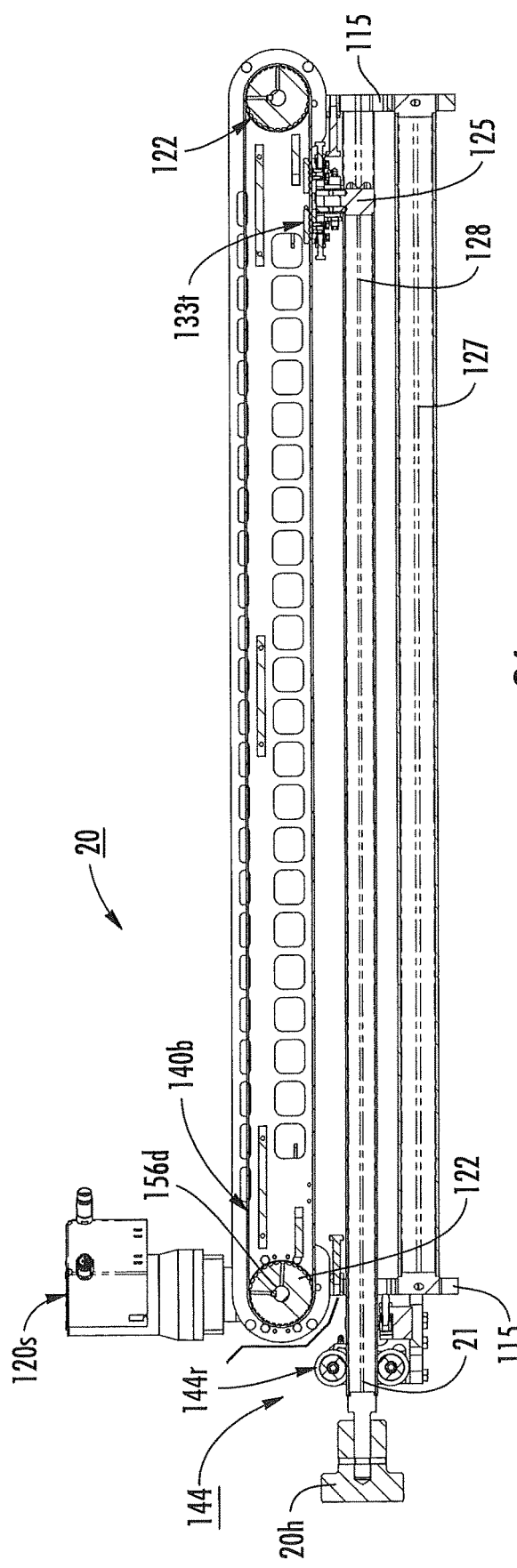
FIG. 2A is a front view of a pusher assembly (without the frame or housing) according to embodiments of the present invention.

FIG. 1 illustrates an exemplary automatic clipping packaging apparatus 10 according to embodiments of the present invention. As shown, the apparatus 10 may include one or more controllers 18, which may be incorporated into or communicate with an HMI (Human Machine Interface), a breech chute 30, a product chute 60, a clipper module or assembly 90, and a discharge zone with, e.g., an optional conveyor or roller table 99. The apparatus 10 typically also includes an automated product pusher assembly 20 (FIGS. 2A-2C). The apparatus 10 can include a skin break 80 that may be turned off or deactivated at desired times or for certain operational modes. The machine/apparatus 10 may also optionally include a derucker (not shown), an optional covering (typically netting) chute 65, and an optional protein or collagen film forming module 70.

In use, the apparatus 10 can comply with FDA food cleanliness guidelines.

It is noted that, although illustrated in FIG. 1 with the pusher assembly 20 and linear drive system 110, the compression section 300 can be used alone or with for other packaging apparatus, including, for example, with pneumatic pushers described in U.S. Pat. Nos. 7,313,896 and 7,392,635, the contents of which are hereby incorporated by reference as if recited in full herein.

FIG. 1 illustrates a packaging system or apparatus 10 that can include a compression section 300 (shown as in a mid-section of the apparatus in this example) with an electric motor 310 that drives an actuator 311 for compressing target product in a compression chamber 333 (FIG. 3A) associated with an elongate loading breech chute 30. This section can be termed a "breech section." The breech chute 30 is formed of two cooperating components 331, 335 that define a cylindrical compression chamber 333 (FIG. 3A) with a substantially fixed diameter D when closed.

As shown in FIGS. 2A-2C, in some particular embodiments, the system 10 can optionally include a pusher assembly 20 that can include a linear drive system 110 with an electric motor 120, preferably a servo-motor 120s. The linear drive system 110 drives a shaft 21 attached to a pusher head 20h. The pusher assembly 20 can be enclosed in a housing 112 as shown in FIG. 1. FIGS. 2A-2C illustrate the drive system 110 without the housing 112 for ease of discussion. In operation, the shaft 21 has a length and stroke cycle that allows it to reciprocate between extended and retracted positions. In the retracted position, the pusher head 20h at the forward end portion of the shaft 21 is in a "home" position upstream of the breech chute 30. In the extended position, the pusher head 20h is extended a distance forward to allow the pusher head 20*h* to extend through the breech chute 30 and typically to enter (and typically exit an egress end of) the product chute 60. The pusher head 20*h* can be releasably locked to the end of the shaft 21, such as via a detachable locking pin which allows a user to remove the pin to slide the head 20*h* off of the shaft 21. Different sized pusher heads 20*h* may be used with different size breech cavities 30*c*.

In some embodiments, the servo-motor 120*s* and drive system 110 are configured to allow the pusher head 20*h* to output between about 100-400 lbf to force product through the product chute 60, typically about 250 lbf to match conventional pneumatic systems. However, the pusher assembly 20 can apply other forces.

The servo-motor 120*s* can be attached to a right angle gear box (FIG. 2A) or used with a linear gear box (FIG. 2B) or without a gear box to drive the linear drive system 110. The motor 120 can be positioned at a forward portion of the pusher assembly 20 so that the gear box engages a drive shaft 156*d* associated with a drive pulley wheel 122. However, the motor 120 and/or gear box can be positioned at different locations, particularly were other drive mechanisms are used.

The servo-motor 120*s* can be any suitable servo-motor, (for example, for food uses, a food grade motor). The servo-motor can be any suitable motor such as MPS-B4540F-MJ52D from Allen Bradley with a Kinetix® 300 or 350 Ethernet/IP Indexing Servo-drive, 3 phase, 6 A, 480V (no filter) using about 3 kW of power, Part No. 2097-V34PR6, from Allen Bradley (Rockwell Automation, Milwaukee, Wis.) with a suitable gear box, such as an "AER" series from Apex Dynamics USA, Holbrook, N.Y. However, other drive systems can be used including screw drives with the electric motor as discussed below with respect to the compression motor assembly 310*a*.

As will be recognized by those of skill in the art, other servo-motors and gear boxes providing satisfactory outputs and control may also be used. To help select suitable components, Motion Analyzer software can be used. For example, Rockwell Automation (Allen Bradley) provides a motion-application sizing tool that can be used for analysis, optimization, selection and validation of Kinetix® motion control systems. See, the URL address of ab.rockwellautomation.com/Motion-Control/Motion-Analyzer-Software.

In the embodiment shown in FIGS. 2A-2C, the linear drive system 110 drives a pusher slide assembly 125 that includes a pair of laterally spaced apart linear rails 128. The pusher assembly 20 can include forward and rearward mounting plates 115. The term "slide assembly" refers to a mechanism that moves the shaft 21 along a defined travel path using a sliding, rolling and/or other movement. The linear drive system 110 can be a belt drive system with belt 140*b* that can be an FDA food grade material suitable for food or cosmetic purposes and able to withstand approved food environment cleaning (wash down) protocols. Exemplary food-grade belts and belt assemblies (belts with pulleys, bearings and the like) are available from Brecoflex Co., Eatontown, N.J. The belt 140*b* may be a AT10 Profile, polyurethane belt with a stainless steel tension member. The belt 140*b* may be between about 100-200 inches long, typically between about 150-175 inches and may be about 1-3 inches wide, typically about 2 inches. However, it is contemplated that other belt sizes may be used.

As shown in FIG. 2A, the pusher slide assembly 125 can include a slide roller assembly 127 with a pair of laterally spaced apart "floating" or self-adjusting rollers that are oriented to rotate about a vertical axis and travel longitudinally along the rails 128, with one roller positioned adjacent a corresponding one rail 128. FIGS. 2A and 2B illustrate that the linear drive system 110 can also include a nose roller assembly 144 with rollers 144*r* that can optionally have the same size and shape as the rollers discussed above for the slide assembly 125.

The forward end portion of the shaft 21 attached to the pusher head 20*h* can extend beyond the rails 128 and beyond the forward mounting block 115. In the extended position, the pusher head 20*h* and forward end of the shaft 21 can extend between about 10-120 inches. The pusher head 20*h* can have a stroke length that is typically between about 20-100 inches, more typically between about 40-80 inches, such as about 70 inches. When in the fully extended position, the front end of the shaft/pusher head is totally supported from the other end with a two-point, spaced apart contact via rollers 144*r* at the nose roller guide and slide rollers 127*r* residing proximate the forward block 115, typically separated a distance that is between about 5-20 inches, typically about 10 inches, for facilitating concentric alignment of the pusher head 20*h* with the product chute 60 when fully extended. For additional description of the optional electric motor driven pusher assembly, see, e.g., co-pending, U.S. patent application Ser. No. 13/546,323, the content of which is hereby incorporated by reference as if recited in full herein.

Figure 3A:
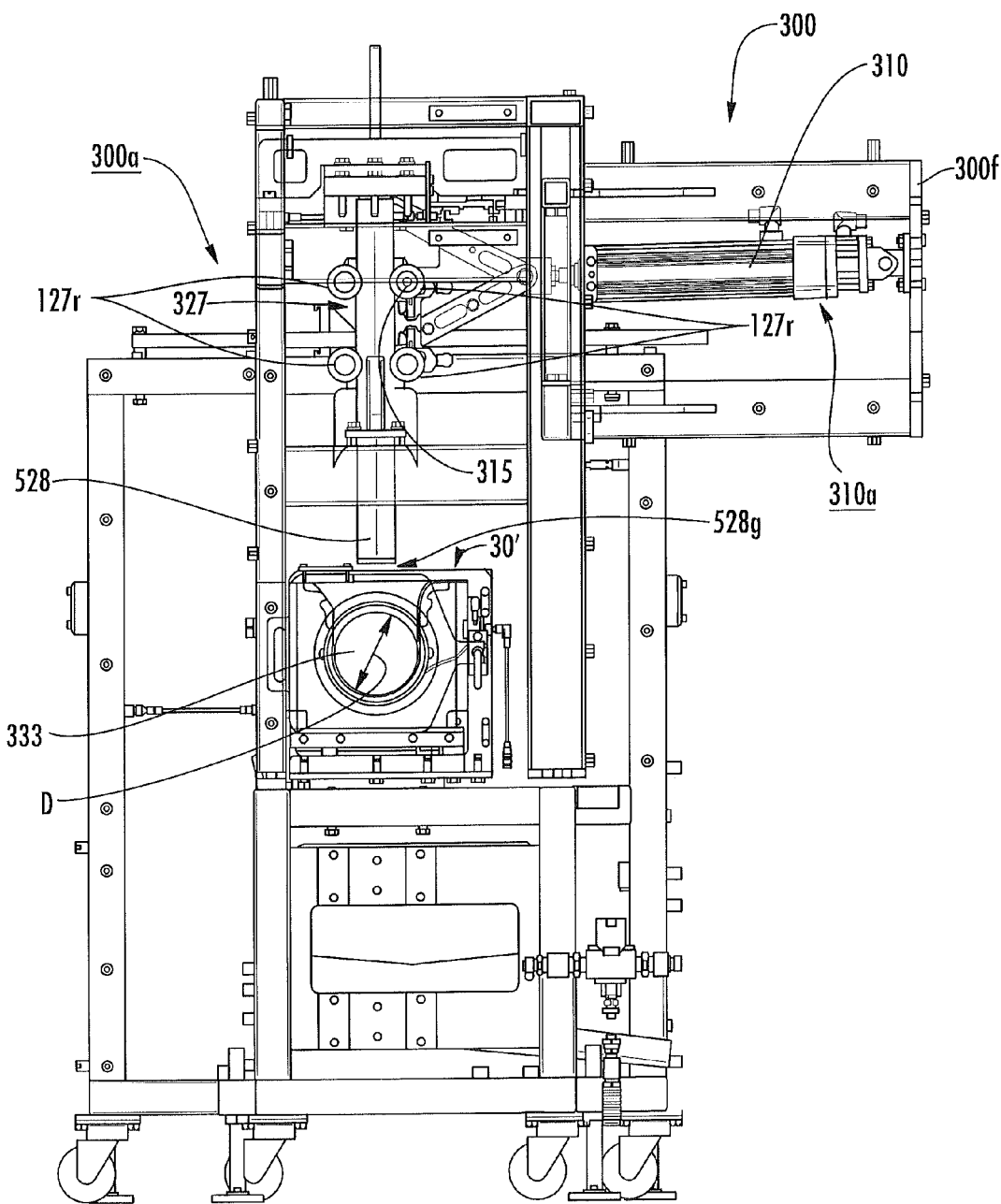
FIG. 3A is an end view of the apparatus shown in FIG. 1, illustrating the breech compression section with a breech compression assembly (without the external housing components) according to embodiments of the present invention.
Figure 3B:
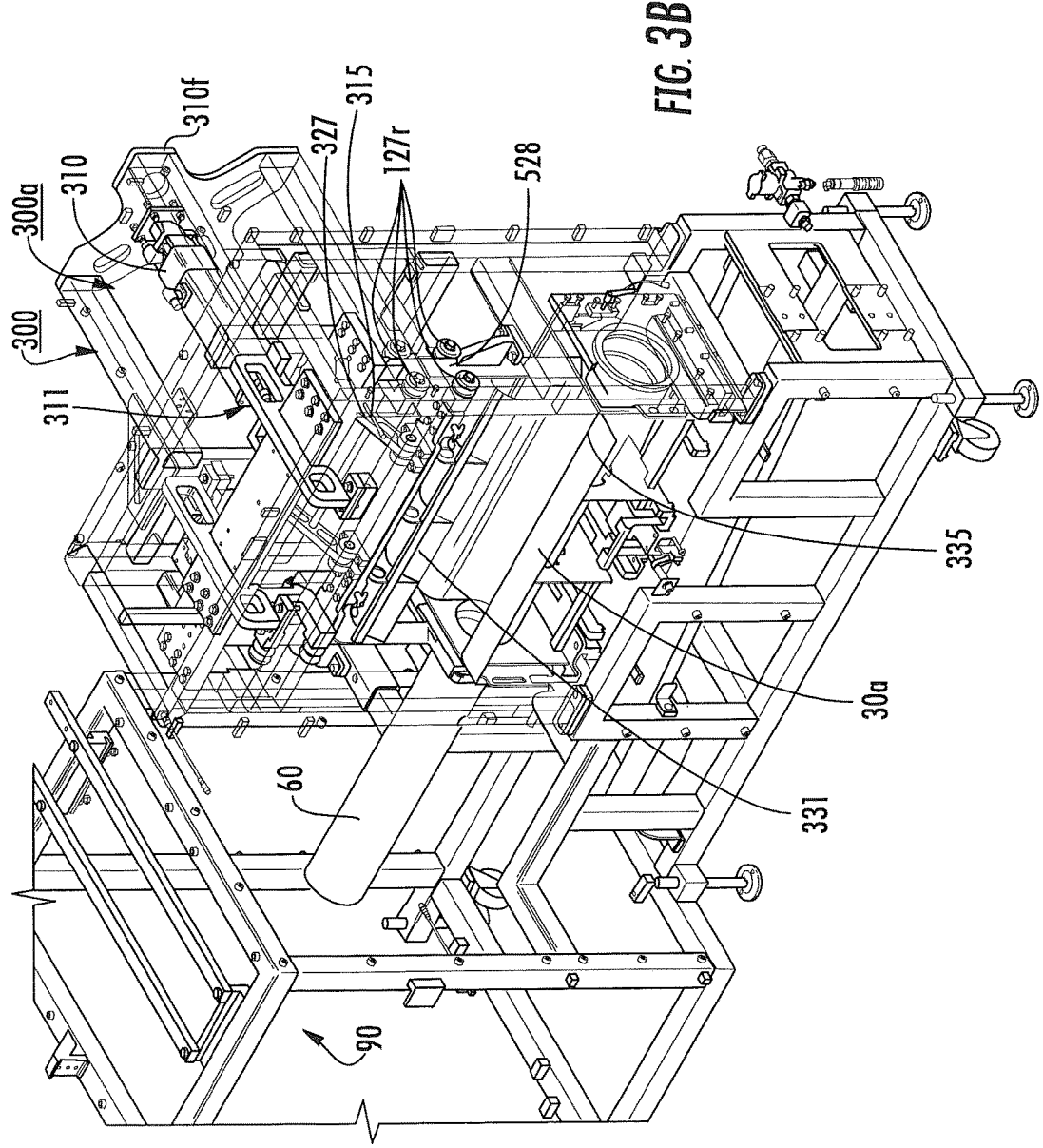
FIG. 3B is a side, end perspective view of the section shown in FIG. 3A.
Figure 3C:
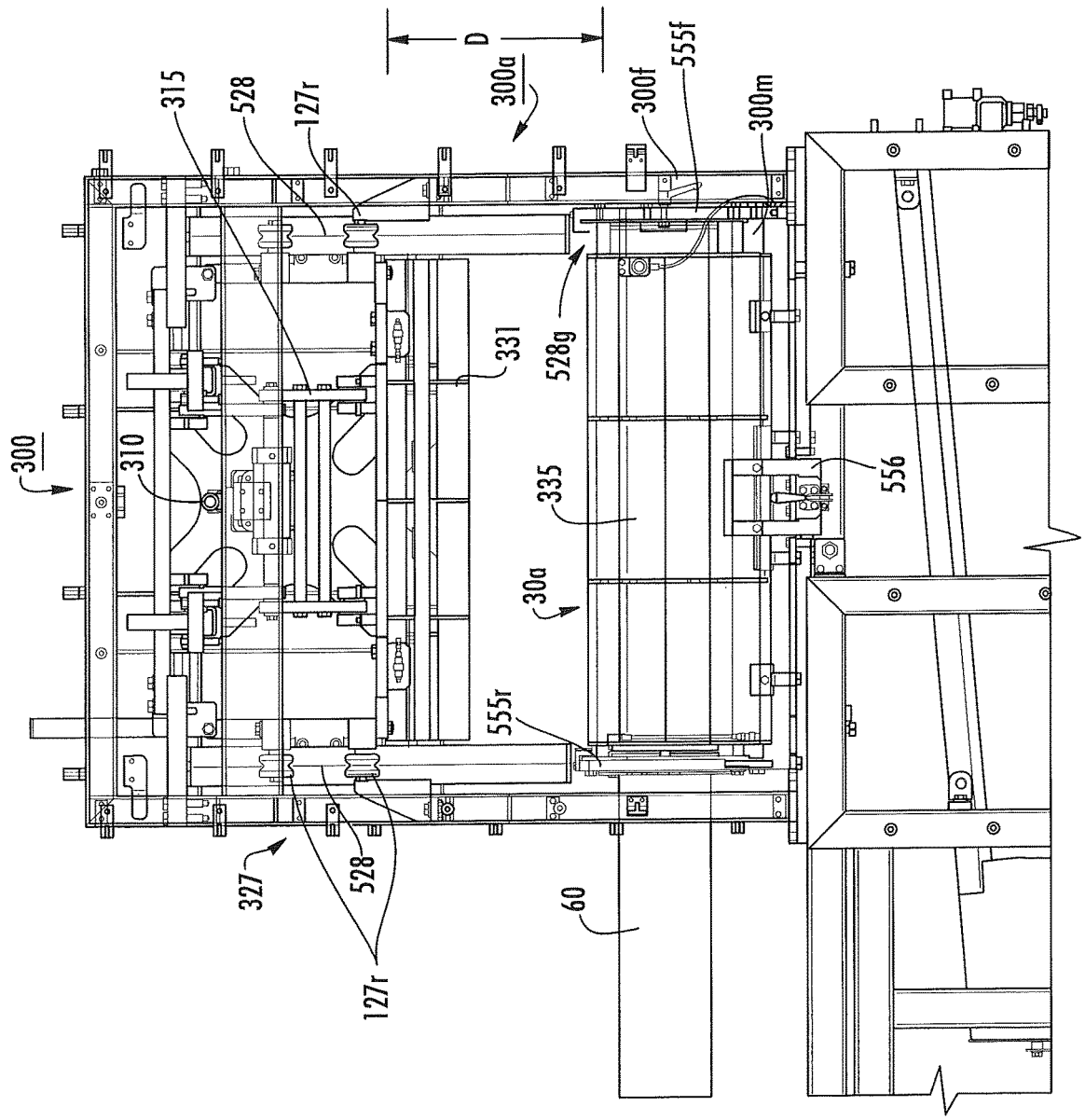
FIG. 3C is a front view of the section shown in FIG. 3A.
Figure 4:
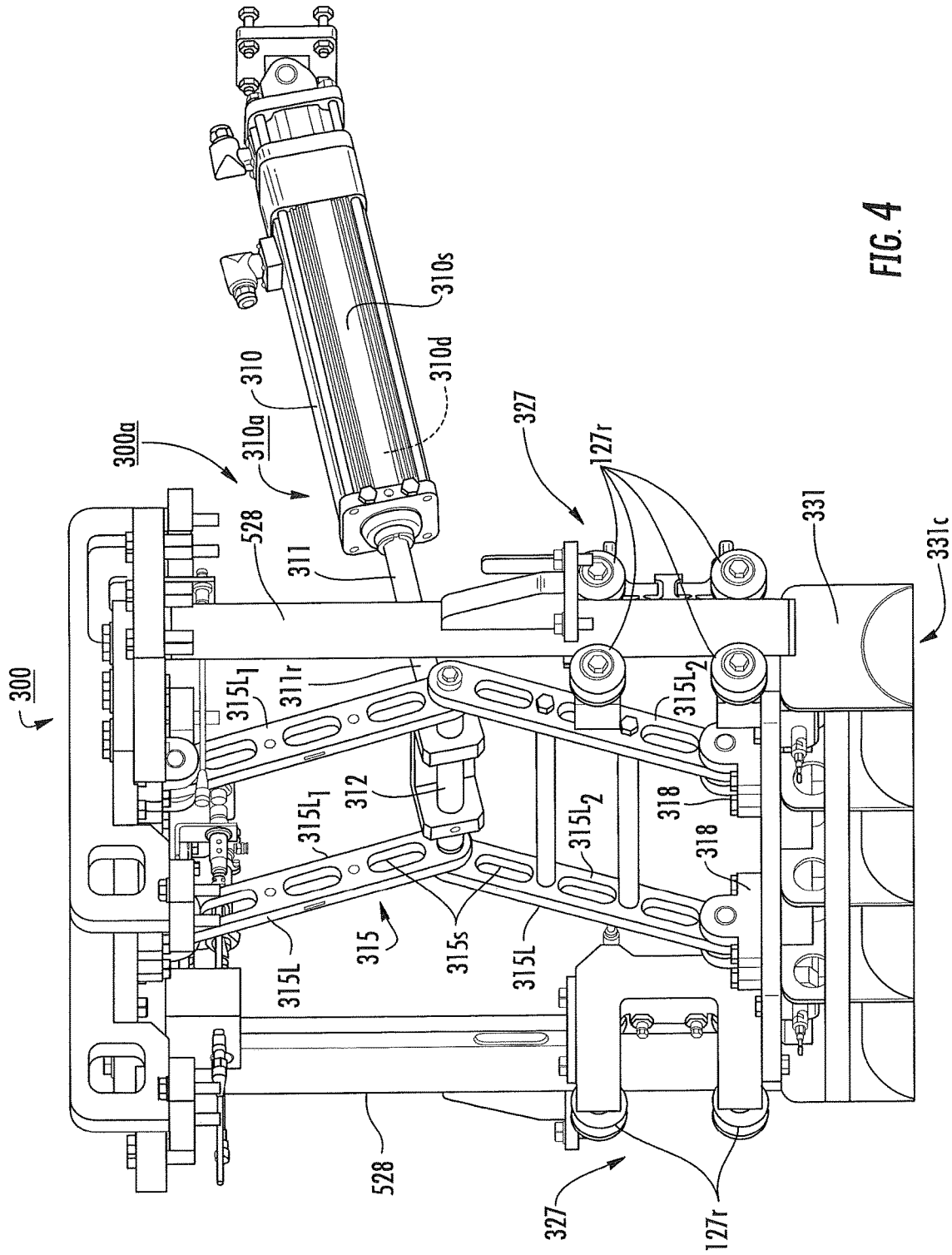
FIG. 4 is a front perspective view of the compression assembly shown in FIGS. 3A-3D.

Turning now to the compression section 300, as shown in FIGS. 3A-3D, the breech compression section 300 includes a compression assembly 300*a* that includes an electric motor 310 that drives an actuator 311 (FIG. 4). The actuator 311 is typically indirectly attached to a ceiling or upper breech chute member 331 that forms the breech chute 30. The actuator 311 causes the member 331 to travel straight (vertically) down from an aligned home position that is between about 1-6 feet above, typically between 1-2 feet above, and detached from a cooperating lower member 335 to an operative position where the upper and lower members 331, 335 enclose and define a substantially cylindrical compression chamber or enclosed cavity 333 with a defined fixed diameter. The upper member 331 can apply a compressive force to content in the chamber 333 to cause the content to take on a substantially cylindrical shape of the defined fixed diameter. The upper member 331 can be interchangeably called a "breech press."

As shown, the actuator 311 can be attached to a linkage assembly 315. The linkage assembly 315 can be attached at its lower end portion to a ceiling or lid 331 of a breech chute assembly 30*a*. In operation, the electric motor 310 drives the actuator 311 to extend and retract to, in turn, move the linkage assembly 315 between upper and lower positions to raise and lower the lid 331 between open and closed positions. When closed, the lid 331 and lower member 335 cooperate to define a breech chute 30 of the breech chute assembly 30*a* with a substantially cylindrical chamber 333 with a substantially fixed diameter "D".

The top or ceiling of the compression chamber 331 can be configured to enter into the upper region of the lower chamber of the lower member 335 with a small clearance all around to create a round product. The small clearance can be between 0.05 and 0.25 (1-6 mm) inches, typically about 0.125 inches (3-4 mm), on each side. When the ceiling member 331 overcompresses, it can be configured to travel down past round, then retract to round before the pusher 20*h* pushes the product (where a pusher is included in the packaging apparatus).

The chamber 333 can be sized and configured to hold any target product, typically an uncooked food product such as whole loins. The chamber 333 can have a length between 8-32 inches, typically about 32 inches long to accommodate whole loins.

As will be discussed below, the breech chute assembly 30*a* can releasably engage the frame 300*f* and can be configured to engage a lock 556 attached to a breech chute support 300*m* attached to the frame 300*f* below the breech chute 30 (FIG. 3C). The breech chute assembly 30*a* can be provided in serially interchangeable assemblies of cooperating upper and lower members 331, 335, each having either an arcuate or semi-cylindrical cavity 331*c*, 335*c* (FIG. 5) that, when closed together, define a substantially cylindrical compression chamber 333 with a substantially fixed diameter in different size fixed diameters, e.g., between about 3-8 inches or between 7-25 cm, for example.

The compression assembly 300*a* can be configured to apply any suitable compression pressure against enclosed produce, e.g., whole muscle, typically between about 100-20,000 lbf, more typically between 250 lbf up to about 14,000 lbf., such as between about 500 lbf or about 1000 lbf to about 14,000 lbf, including between about 10,000-14,000 lbf, or any value therebetween any of the noted ranges, in any increment, typically 5-10 lbf or 10-100 lbf increments, with the upper range used for whole loin to produce a pressure that is difficult to achieve otherwise. However, the compression assembly 300*a* can be configured to provide any suitable force range. It is contemplated that a 15-20 pound (e.g., about 17 lb) whole muscle uncooked beef product can be compressed to a four inch diameter long cylindrical product, e.g., 16-32 inches long, using the compression assembly 300*a*. With controlled, large compression pressures provided by embodiments of the compression assembly 300*a*, a high quality roast beef product may be produced, for example.

Figure 12:
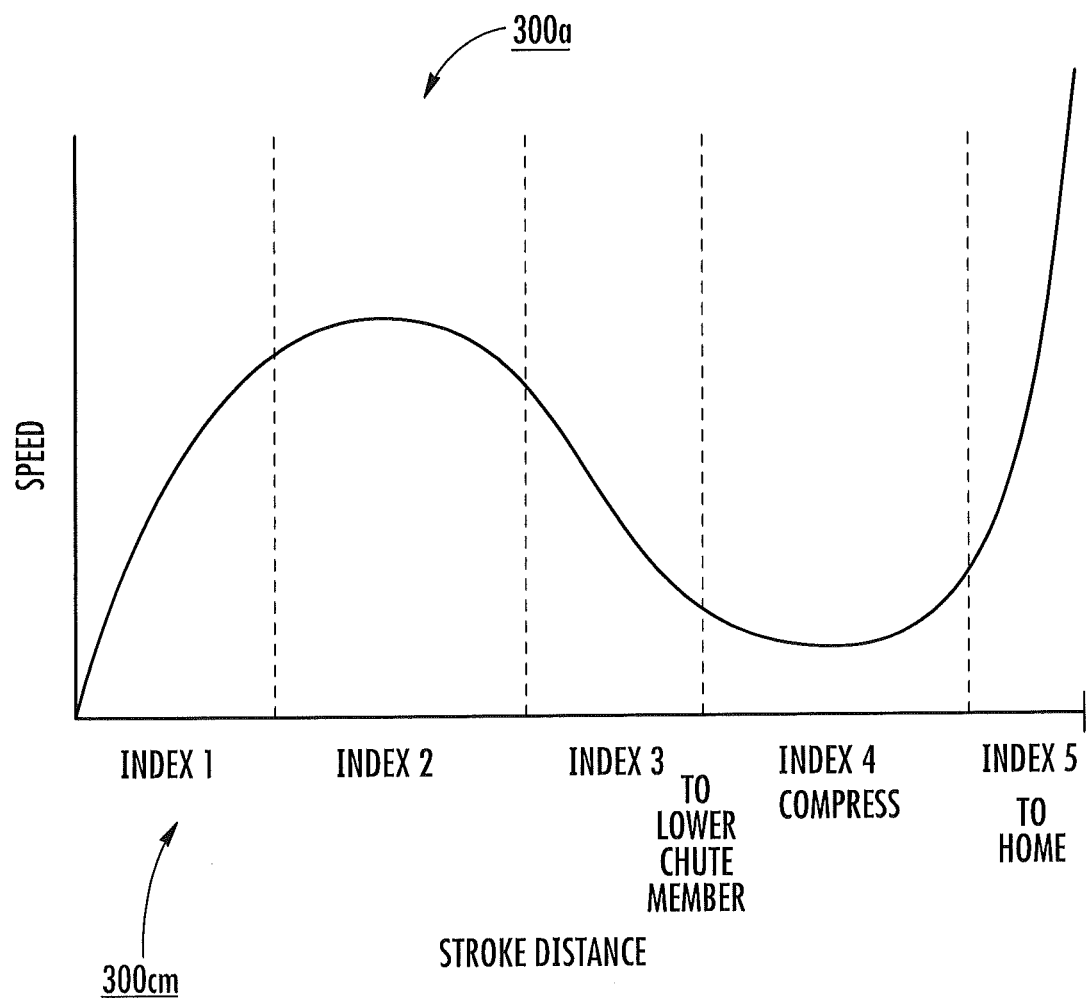
FIG. 12 is an exemplary prophetic compression stroke cycle/timing diagram according to embodiments of the present invention.

The speed, acceleration and stroke distance of the motor 310, hence actuator 311, upper breech chute member 331 and other cooperating components, can be electronically (programmatically) adjusted using the HMI or other input associated with the control circuit or controller 18, between packaging operations for different products and/or within a compression cycle allowing for more control over pressure applied to a product and at what time in the compression cycle. For example, the stroke may operate at a first acceleration to a first speed until the ceiling 331 approaches or closes against the lower member 335, then may decelerate to a slower speed for an active compression, then may reduce applied force, if in an overcompress mode, to return the enclosed product to a cylindrical shape and allow the pusher 20*h* to extend therethrough, while still engaged or proximate the lower member 335. FIG. 12 illustrates that different indexed segments of the stroke cycle of the compression assembly 300*a* can have adjustable and/or defined speed attributes/timing shown as five different indexed portions of the cycle, but different profile characteristics and different changes may be used.

The lid 331 can optionally be attached to first and second longitudinally or axially spaced apart roller assemblies 327 (this direction is described with respect to the translation direction of the pusher or movement of the product as it is processed/packaged and can alternately be described as laterally spaced apart when viewed from the front of the apparatus 10 as shown in FIG. 1). The roller assemblies 327 travel over respective vertical rails 528. Thus, the vertical travel and alignment of the lid 331 can be constrained by the vertical rails 528.

Notably, however, the vertical rails 528 and roller assemblies 327 are not required. Indeed, the linkages 315 may be configured to provide the desired travel path and constraint without using any supplemental supports and/or guides. In other embodiments, vertical slides can be used rather than rollers (not shown).

In a preferred embodiment, the electric motor 310 is a servo-motor and the breech compression section 300 with the compression assembly 300*a* can include a servo control box attached to a support frame 300*f*. However, the servo, controls may be provided in other locations and/or integrated into other modules of the device (local or remote) or in other boxes or panels and the like.

The motor 310 can be a servo-motor and the actuator 311 can be integrated into the servo-motor without requiring a gear box. However, it is contemplated that the motor 310 can be used with a linear or right angle gear box to drive the actuator 311.

As shown, the electric motor 310 is substantially horizontal (e.g., offset from horizontal between 0-30 degrees). The electric motor 310 can be a servo-motor and can be the same or different from that described with respect to motor 120*s* above.

The actuator 313 can be driven with a screw drive 310*d* powered/driven by the servo-motor 310*s* and can have a servo indexing drive. The screw drive 310*d* can comprise a ball screw, acme screw or roller screw. For example, the motor assembly 310*a* can comprise a servo-motor 310*s* and ballscrew drive 310*d* such as a Tolomatic ballscrew with an AB MPF-B330 motor. Alternately, the motor assembly 310*a* can comprise a roller screw 310*r* and an integrated motor such as that available from Exlar, e.g., GSX40-1002-MXW-AB9-368-RB-FG-58341. A roller screw is a mechanism for converting rotary torque into linear motion, in a similar manner to acme screws or ball screws. Roller screws can carry heavy loads for thousands of hours in the most arduous conditions that may be particularly suitable for the compression actuator. As known to those of skill in the art, the roller screw's design for transmitting forces uses multiple threaded helical rollers that assembled in a planetary arrangement around a threaded shaft (shown below), which converts a motor's rotary motion into linear movement of the shaft or nut. The motor assembly 310*a* can have a brushless servo design for closed-loop servo systems for velocity and position control. Position feedback can be delivered in a number of different forms. These include resolvers, encoders or internally mounted linear position feedback sensors.

The actuator 311 (e.g., actuation rod 311*r*) can extend from a front end portion of the motor at a similar angle from horizontal, e.g., between 0-30 degrees. However, in other embodiments, the motor 310 may be positioned vertically and the actuation rod 311*r* can extend substantially vertically or offset from vertical between about 0-30 degrees, for example. The substantially horizontal orientation of the (servo) motor 310 for running the actuator 311 substantially horizontal makes for a shorter machine in total height, and can operate the linkage assembly 315 to provide maximum force on the product when fully extended, functionally making a "stiff arm" when fully extended where the upper and lower links are substantially aligned. The stiff arm configuration can inhibit or prevent the pusher 20 from being forced upward when the electric (servo) motor 120-driven pusher head 20*h* starts to push the meat out of the breech chute 30.

Similar to rails 128 discussed above, the rails 528 can be substantially square in section. However, other embodiments can use other rail configurations, e.g., round, hexagonal, oval or other cross-section shaped rails 528. Although shown as two rails, the system 300*a* can include a single rail and one roller (or slide) assembly or more than two rails 528 and cooperating roller (or slide) assemblies 327 may be used.

One rail 528 can also be square and larger than the other rail 528. One rail can have a different cross-sectional shape as well, including round and oval and other polygonal shapes including, for example, rectangular, hexagonal, and octagonal. In some embodiments, the rails 528 are drawn, stainless steel, hardened tubes that do not require machining.

As shown in FIG. 3A, for example, the lower end of the rail 528 can terminate or reside above the top of the lower member 335 so that there is a gap space 528g over a forward and rearward breech rings 555f, 55r, respectively, on each end of the breech chute 30.

The rollers 127r can be free-floating (biased and/or self-adjusting) rollers and can operate without precision railing thereby providing for a more economic system. The rollers 127r of the compression assembly 300a may have a different size or be the same size as that for a pusher assembly when used on a common packaging apparatus. The roller assembly 327 can include a plurality of rollers 127r that are oriented to rotate about a vertical axis and travel along a respective rail 528. As shown, each roller assembly 327 can include first and second vertically spaced apart cooperating pairs of rollers 127r, one roller of each roller pair residing on opposing sides of a cooperating rail positioned therebetween. However, in some embodiments, a single roller assembly 327 can be used and a single roller 127r used for a respective assembly 327. The roller assembly 327 may also operate without roller pairs and can include more than four rollers on a single side of the vertical rail 528.

The rollers 127r can be "V" shaped rollers or rollers that have a medial recess relative to outer portions thereof. The "V" can have about a 90 degree angle. The roller width can be about 1.5 inches and diameter of about 2.5 inches. An exemplary roller is available as P. N. 2.50"×1.50" All Poly V-Groove 75D Black from Sunray, Inc., Rutherfordton, N.C. However, other roller sizes and dimensions may be used. The rollers 127r can comprise a food grade polymeric material such as polyurethane and have a hardness of between about 60-90 durometer, typically about 75 durometer.

As shown in FIG. 4, for example, the linkage assembly 315 can include a plurality of links 315l. The linkage assembly 315 can optionally be configured as first and second pairs of scissor links 315s, each pair having an upper 315 and lower link, 315L$_1$, 315L$_2$, respectively, that cooperate to pivot up and down to extend and retract and thereby move the top or lid 331 of the compression chamber straight up and down about a lower cooperating member 335. As shown, the actuator 311 is attached to a bracket 312 that is attached to respective upper and lower end portions of the links 315L$_2$, 315L$_1$. The lower end portion of the lower links 315L$_2$ are pivotably attached to a mounting bracket 318 attached to the top breech chute member 331. The top end of the upper linkages 315L$_1$ are pivotably attached to the frame 300f and can remain at the same height during operation.

In some embodiments, the linkage assembly can travel from a retracted position (FIG. 3A) where the links 315L$_1$, 315L$_2$ reside closely spaced together, typically within about 6 inches to 24 inches of each other with the lower end of the lower links 315L$_2$ spaced apart from the upper end of the upper links 315L$_1$ to an extended position (FIG. 3D). In the extended position, the links 315L$_1$, 315L$_2$ can be vertically aligned or offset by about 10 degrees from vertical, but typically not past vertical to avoid inadvertent jamming or locking of the scissors 315s.

The upper member (e.g., upper breech compression member) 331 can travel a defined stroke distance "D" (FIG. 3C) that is typically between about 12-72 inches, and more typically between about 12 inches to about 24 inches or between 12-16 inches so as to allow for ease of access to the lower breech member for loading product and/or for ease of tooling change out.

In other embodiments, different linkages, including four bar linkages, cams, gears, chain drives, or other mechanisms can be used to raise and lower the upper member 331 of the breech chute 30.

Thus, in operation, meat on the tray 37 (FIG. 1) can be (manually or automatically) pushed into the lower breech chute member 335. The door 531 (FIG. 1) is closed (automatically, semi-automatically or manually). A sensor notifies the controller 18. The breech door 531 locks. The breech compression assembly 300a electronically unlocks. The top breech chute member 331 (e.g., breech press) closes on the meat in the cavity 333. The pusher 20 (FIGS. 2A-2D) pushes the meat out of the breech chute 30, through the chute 60 and into the casing. Voiders close and spread to create a rope for the clip(s) from the clipper 90 (FIG. 1). The clipper 90 applies two clips on the rope area created by the voiders. A knife cuts between the two clips. The clipper and voider reset. The clipped, packaged product exits down the conveyor or other exit configuration 99 on to a table or other collection area. The top breech chute member 331 automatically retracts and locks in the up position. The pusher 20 retracts. The breech door 531 adjacent the tray 37 unlocks and the door 531 opens. This sequence can vary and certain actions can occur concurrently to speed up a respective packaging cycle. For example, the top member 331 can retract as the pusher exits the breech chute 30 and the pusher can retract as the voiders and clippers perform their respective actions.

It is noted that the door 531 (FIG. 1) can pivot open or slide up and down or side to side to close and open to block access to the interior of the machine (when closed) or allow access to the open lower breech member (when open). Although shown as visually transmissive, e.g., translucent or transparent, other door configurations may be used.

Figure 5:
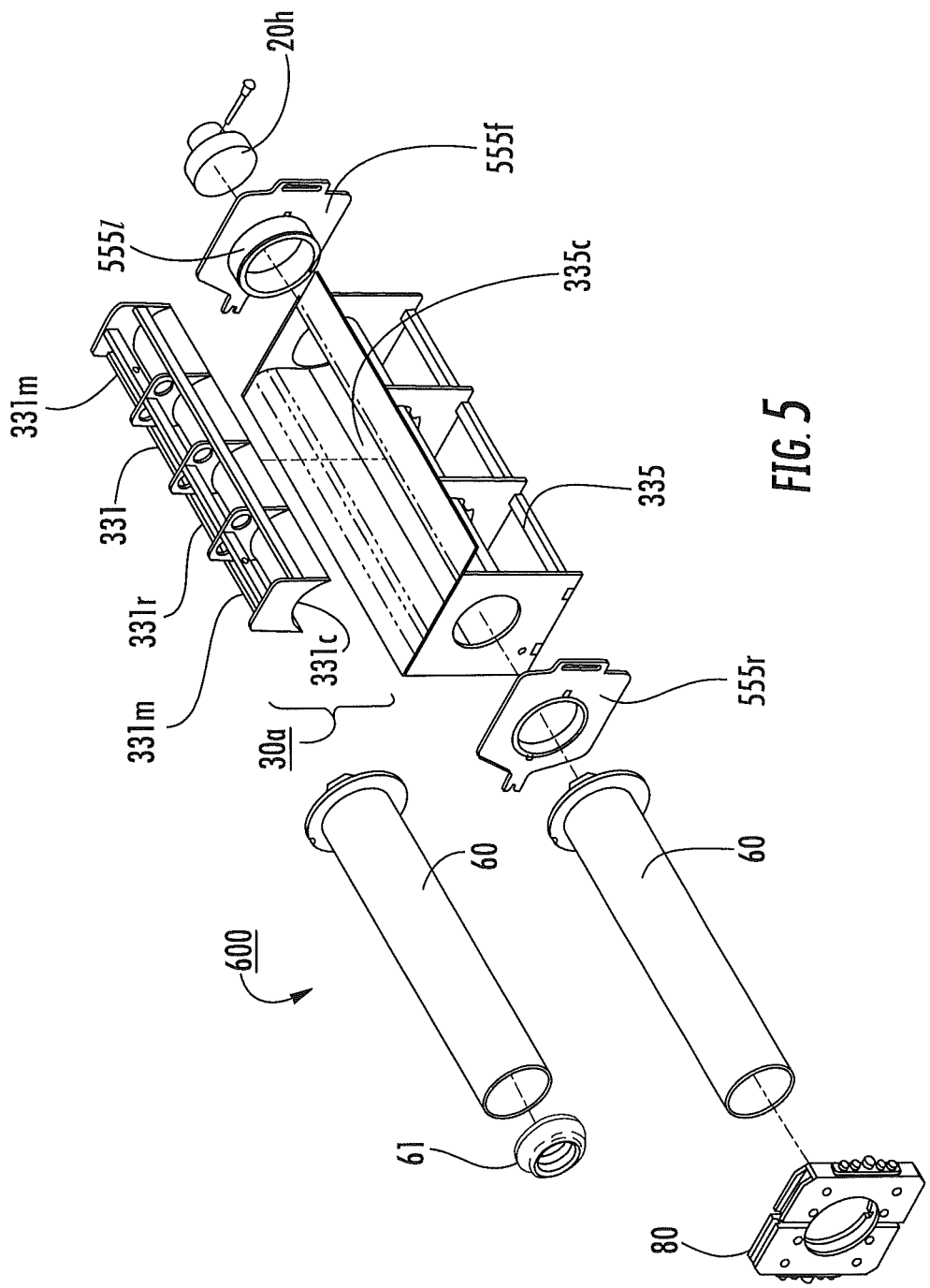
FIG. 5 is an exploded view of an exemplary tooling kit for interchangeable different diameter sized chutes according to embodiments of the present invention.

FIG. 5 illustrates a tool kit 600 with a releasable breech chute assembly 30a that can be provided in different sizes and can be interchangeably held by the frame 300f. The assembly 30a includes the ceiling or top member 331, the bottom member 335, each with a defined arcuate cavity size 331c, 335c that together cooperate to provide a defined diameter. The tool kit 600 can also include at least one (shown as two) correspondingly sized diameter product chute 60, a skin break assembly 80b with center aperture of the fixed diameter, a loading cone (in fill tube) with the fixed diameter, breech rings 555f, 555r with apertures of the fixed diameter, and pusher head 20h of the fixed diameter. The breech rings 555f, 555r can have an internal lip 555l that slidably enters and engages the bottom breech chute member 335. The different sizes of the fixed diameter "D" can be two or more of the following: about 3 inch, 4 inch, 5 inch, 6 inch, 7 inch, 8 inch, 9 inch, 10 inch, 11 inch or 12 inch diameter. For a metric assembly, the diameter D can be about a 6 cm, 7 cm, 8 cm, 9 cm, 10 cm, 11 cm, 12 cm, 13 cm 14 cm, 15 cm, 16 cm, 18 cm, 19 cm, 20 cm, 21 cm, 22 cm, 23 cm, 24 cm, 25 cm, 26 cm, 27 cm, 28 cm, 29 cm, or 30 cm. The assemblies can be provided in a plurality of the noted different sizes or in other desired fixed diameter sizes.

To interchange one sized tool kit 600 for another, the following components can be removed from the frame 300*f* and replaced with like components of different size. The ceiling 331 can be removed and replaced with another ceiling of a different size. The pusher head 20*h* can be removed and replaced with a correspondingly sized pusher head of like-size diameter. The breech rings 555*f*, 555*r* can be removed at the same time or serially. In reverse, the breech rings 555*f*, 555*r* can slide into position then lock in place with KIP style handles 555*h*. The bottom member 335 can be removed. The product chute 60 can be removed. The skin brake assembly 80 can be removed. The stroke distance of the upper member 331 between home and fully extended positions can be the same or may vary depending on the size of the fixed diameter components in use.

Figure 6:
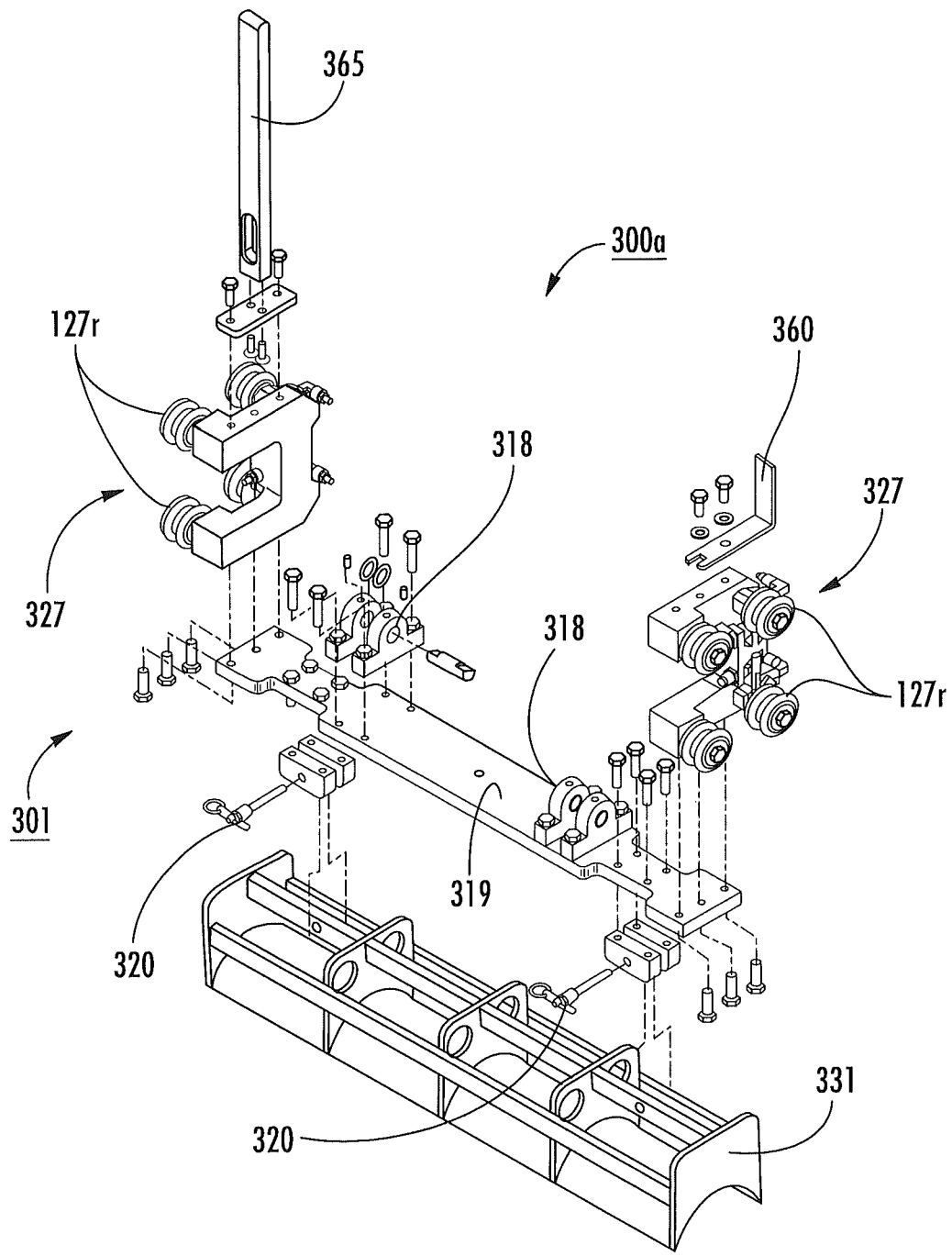
FIG. 6 is an exploded view of a press carriage assembly according to embodiments of the present invention.

FIG. 6 illustrates an example of a press carriage assembly 301 (a portion of the compression assembly 300*a*) with the top member 331, rollers 327 and linkage brackets 318. The linkage (e.g., "lift") brackets 318 can be provided as bearing mounts.

As shown, the assembly 300*a* can include a flat plate 319 that releasably engages a respective top member 331 via quick release members 320 that can be slidably engaged and released to attach and detach the top member 331 from the plate 319. The plate 319 can be attached to the brackets 318 and the roller assemblies 327.

More particularly, in some embodiments, the brackets 318 can be provided as a pair of longitudinally spaced apart bearing mounts attached to the mounting plate 319 and extending above the mounting plate 319. The assembly 301 can also include a pair of longitudinally spaced apart release mounts 331*m* attached to an underside of the mounting plate 319 and extending downward. The release mounts 331*m* can be provided to engage a horizontally and longitudinally extending center member 313*r* in at least two locations and lock thereto using quick release pins 320 (with grip handles) as shown.

As is also shown in FIG. 6, the assembly 300*a* can include a flag 360 that can communicate with an electronic sensor to monitor when the top member 331 (e.g., "breech press") is up and a top lock 365 that can be used to lock the top member 331 in the raised position prior to opening the breech door 531 (FIG. 1). As shown, the top lock 365 includes an aperture or slot 366 that engages a lock that can be automatically extended when directed by the controller and/or when the flag 360 indicates the top member 331 is raised. In other embodiments, other "flags", sensors and locks can be used to trigger the locking and unlocking and to provide the locking engagement of the top member 331 in the "home" or retracted position.

Figure 7A:
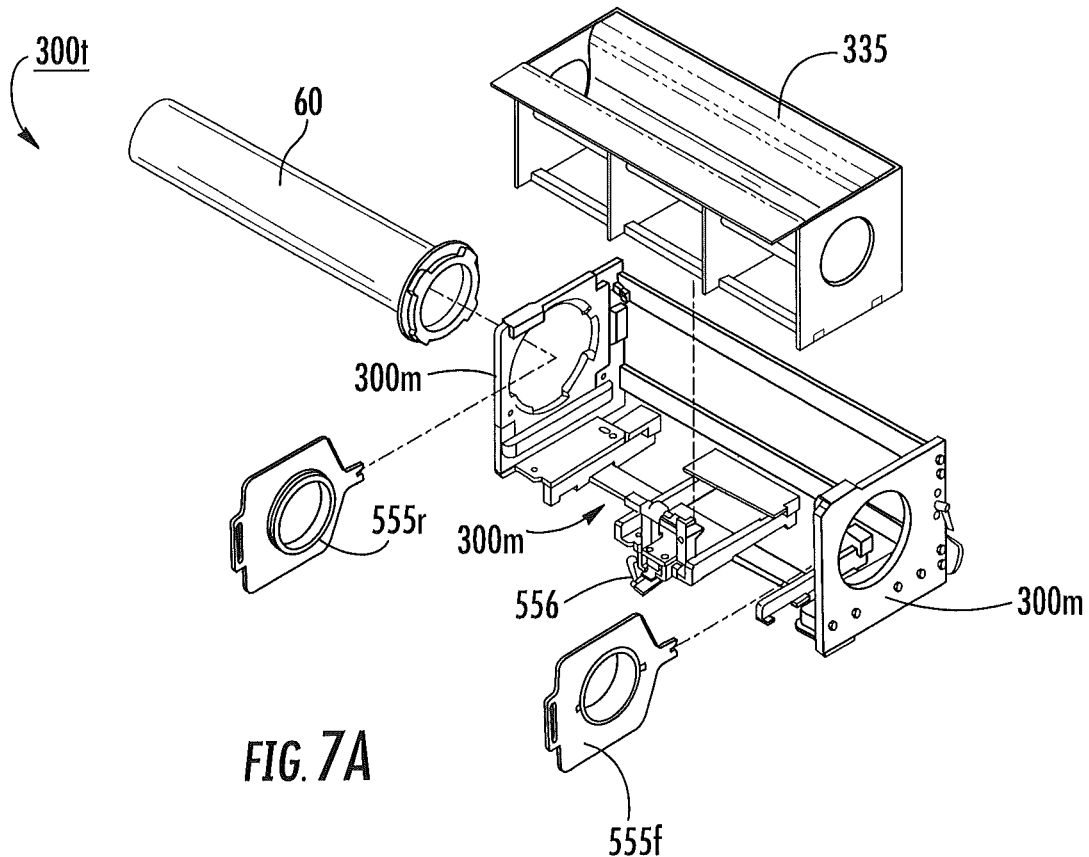
FIG. 7A is an exploded view of a bottom tooling assembly that interchangeably holds different diameter size bottom chute members according to embodiments of the present invention.
Figure 7B:
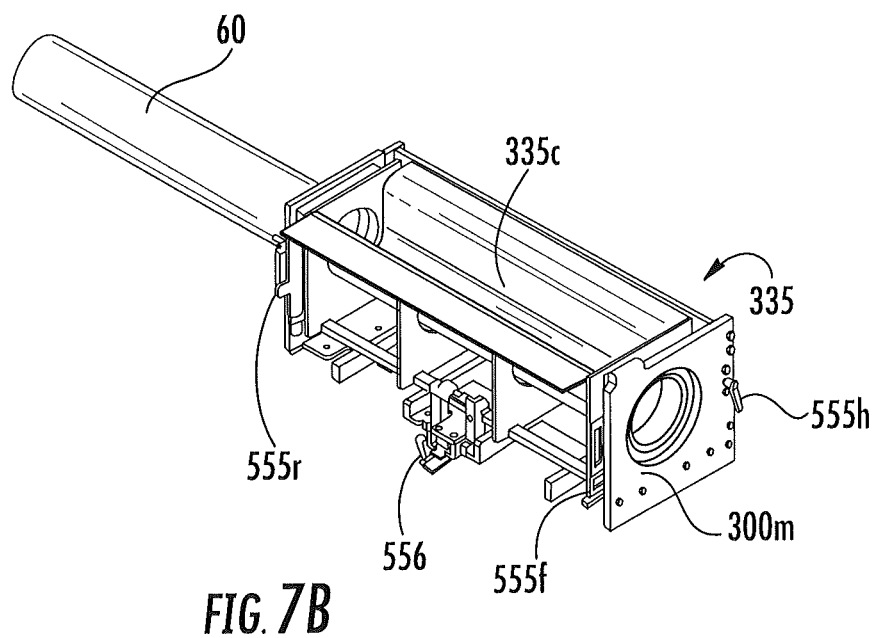
FIG. 7B is an assembled view of the bottom tooling assembly shown in FIG. 7A.

FIG. 7A is an exploded view of a bottom tooling assembly 300*t* associated with the compression section 300 that illustrates the breech chute support 300*m* with the lock 556 that releasably engages the bottom member 335 and the breech rings 555*f*, 555*r*. FIG. 7B is an assembled perspective view of the components shown in FIG. 17A.

Figure 8:
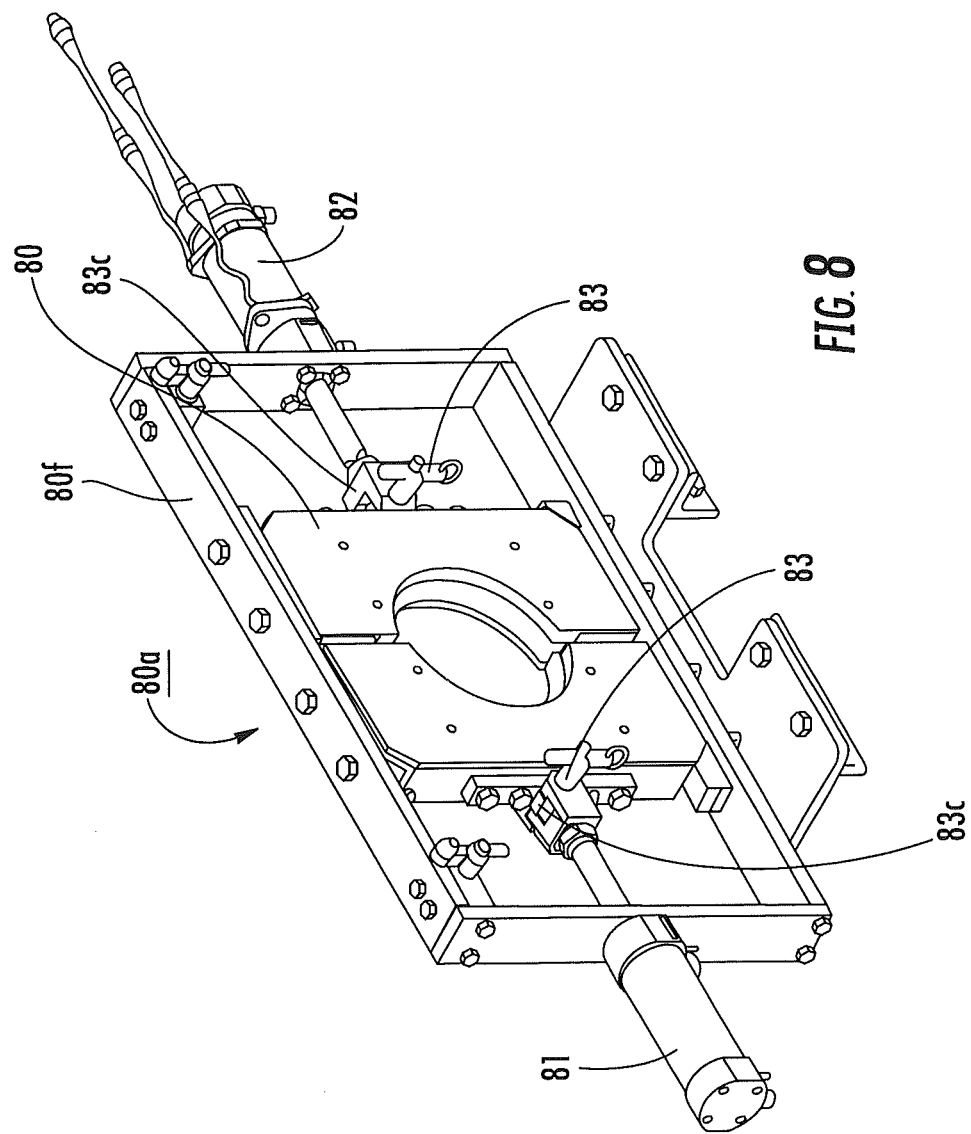
FIG. 8 is a side perspective view of a skin break assembly that can releasably hold different diameters size skin break components according to embodiments of the present invention.

FIG. 8 illustrates the skin brake assembly 80*a* with the interchangeable skin break component 80 shown in FIG. 5. The assembly 80*a* includes a frame 80*f* that cooperates with actuators 81, 82 to move the skin break component 80. The skin break component 80 can be releasably mounted to the frame 80*f* with quick release pins 83 as shown. The quick release pins 83 allow a user to detach the component 80 at clevis 83*c*.

Figure 9:
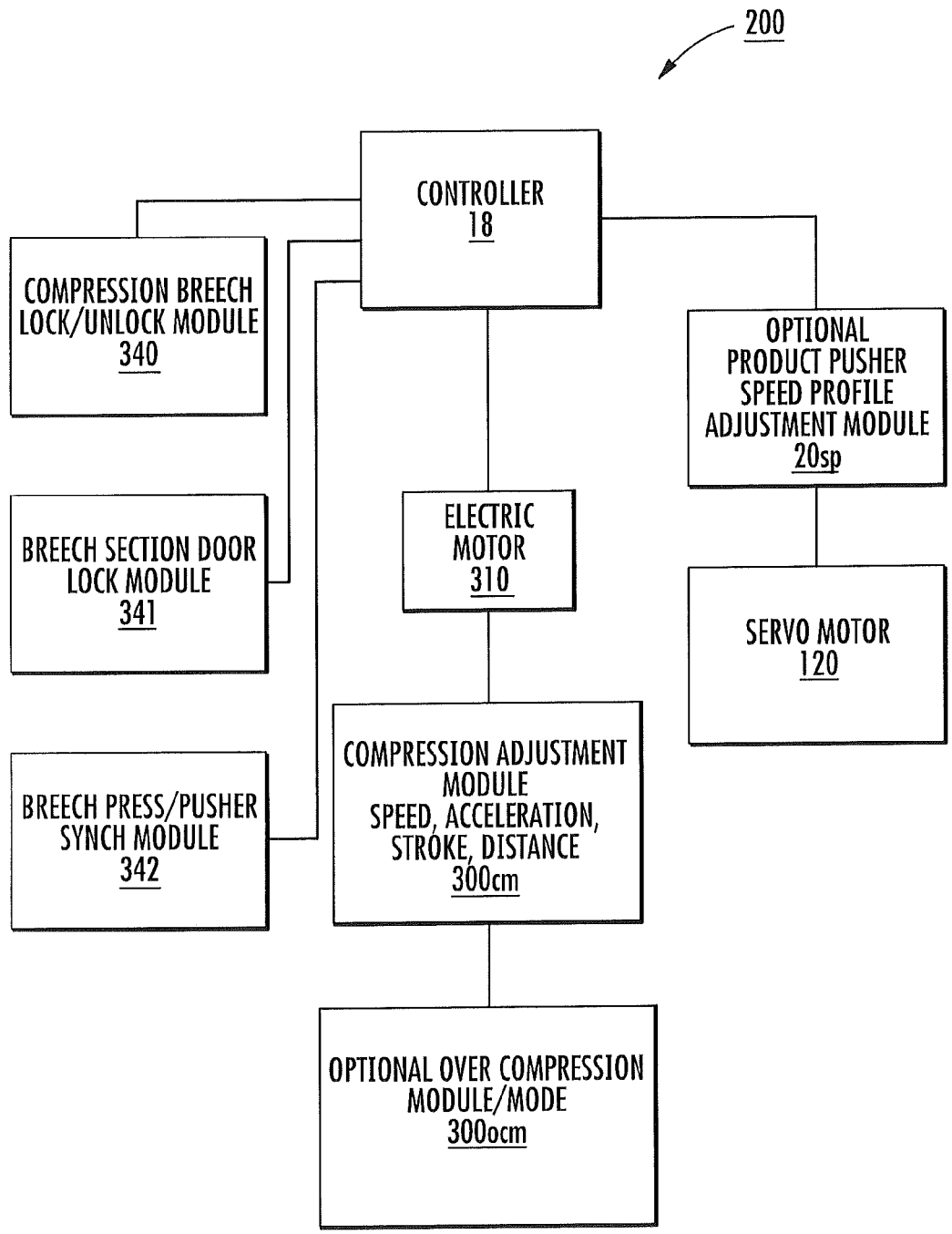
FIG. 9 is a schematic illustration of a control circuit according to embodiments of the present invention.

FIG. 9 is a schematic illustration of a control circuit 200 for the compression assembly 300*a*, the pusher assembly 20 and/or packaging system 10. As shown, the circuit 200 includes a controller 18 (which can be more than one controller and may be remotely controlled or monitored via the Internet or other local or wide area network). The controller 18 can communicate with electric motor 310 and provide a compression adjustment or stroke adjustment module 300*cm* and an optional over compression module/mode 300*ocm*.

The controller 18 can optionally also communicate with a product pusher speed profile adjustment module 20*sp* which controls the electric motor 120 (which may optionally be a servo-motor 120*s*), thereby allowing for different index segments and speeds at different stroke distances as discussed above. The controller 18 can also communicate with a compression breech lock module 340 and breech compression unlock module 341 (which communicates with the compression section door lock).

The controller 18 can optionally communicate with different actuators and sensors to control operation of features that can promote safe operation and/or speed.

The control circuit 200 can include a breech press lock/unlock module 340, a breech section lock/unlock module 341 and an optional breech press synch module 342 that can synchronize slight movement to accommodate or lock into position as the pusher 20 extends to push the compressed product through the cavity formed by the closed breech members 331, 335.

The controller 18 can have a programmatically selectable menu of run modes that are recipe-specific and can include product size as one input parameter to select a compression cycle and optionally also skin braking and clipping parameters for automated control, and the like. Accordingly, the breech loading chute 30 can be provided in a range of different sizes configured to provide the desired product chamber diameter associated with the desired product size (e.g., about a 3 inch diameter chamber of about a 3 inch diameter product).

The system 10 can be configured to run different diameter size products, typically between about 2-9 inches, such as, for example, about 3 inch diameter products up to about 8 or 8.5 inch diameter products, in about 0.5 inch or 1.0 inch increments. The product chute 60 may be provided in different corresponding sizes to match the sizes of the breech loading chutes 30 (e.g., the diameter when in the cylindrical closed configuration). The netting chute 65 may also be provided in an assortment of suitable sizes to accommodate the different product sizes desired.

A proximity sensor can be used to confirm the position of the pusher head and synchronize the release of the lock of the door 531 for chute 30, and the like. For further description of sensors, locks and components useful for some packaging systems, see, U.S. Patent Application Publication No. 2010/0287883, the contents of which are hereby incorporated by reference herein.

Figure 10:
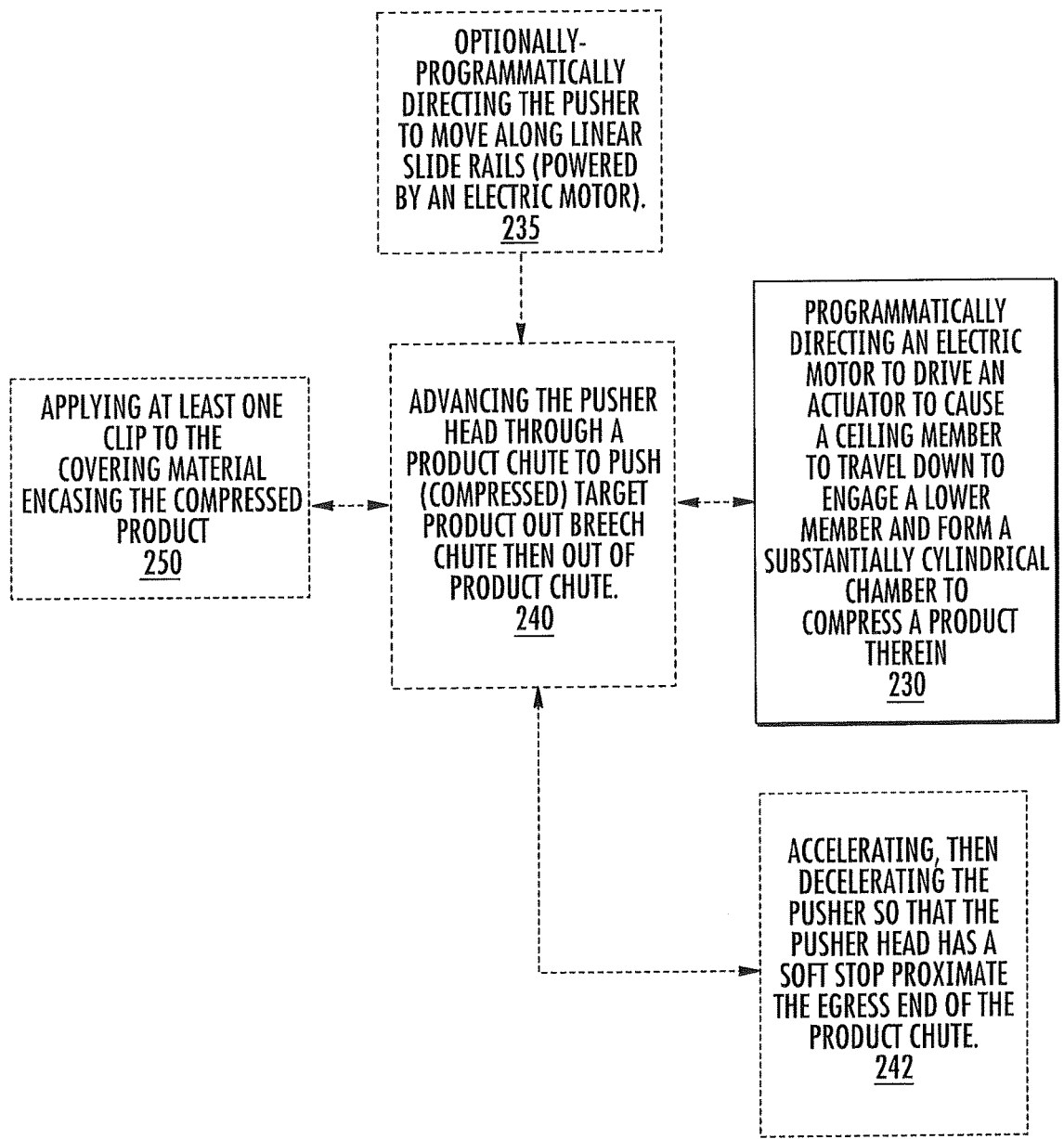
FIG. 10 is a flow diagram of illustrative operations that can be used to carry out embodiments of the present invention.

FIG. 10 is a flow chart of exemplary operations that can be carried out to package product according to embodiments of the present application. As shown, the method includes programmatically directing an electric motor to drive an actuator to move a ceiling of a compression member from a location that is spaced apart and above a cooperating lower member to an operative position to contact the lower member and define a substantially cylindrical enclosed cavity to compress target product held therein into a substantially cylindrical shape (block 230).

Optionally, the method may include programmatically directing a pusher with a pusher head to move along linear rails (powered by an electric drive motor) (block 235) and advancing the pusher head through a product chute to push target product out of the product chute (block 240). The advancing step can be carried out to push the compressed target product out of the breech chute, then out of an aligned product chute.

The method may also optionally applying at least one clip to material covering or encasing the compressed product (block 250).

Many of the operations can be carried out under PLC control. That is, a controller/processor 18 (such as a Programmable Logic Controller) may be configured to automatically monitor operational status and conditions through a Servo Control Module and/or a Safety Circuit Module.

Summarizing some particular embodiments, by way of example only and not limited to this exemplary operation or use, an operator can manually place pieces of product, that may be pre-positioned on the side table 37 (FIG. 1), then in the breech loading chute 30. Alternatively, automated loading may also be used (not shown). The automated compression can be carried out using compression assembly 300*a*. The product pusher assembly 20 can linearly retract and advance the pusher head along slide rails 128 to push a product through the product chute 60 so that the product is enclosed in netting, then positioned proximate the clipper 90. The product pusher head then retracts to a resting "home" position upstream of the breech loading chute 30. When the product exits the product chute 60 it is encased/held in the covering material as the covering material is drawn downstream. The clipper then operates so that the covering material may be clipped, welded, fused, knotted or otherwise closed and/or sealed at leading and trailing edge portions thereof.

In some embodiments, meat product is pushed out of the product chute 60 into fragile edible collagen paper or film. The pusher head 20*h* can be controlled to have a "soft stop" proximate the egress end of the product chute so that the meat exits the product chute with decreased force to inhibit bursting or tears in the collagen paper.

Summarizing some embodiments, the system can optionally electronically confirm the pusher head 20*h* is retracted and/or in a home position as well as the compression actuator 331 before unlocking the loading door 531. Once opened, the operator loads discrete whole muscle pieces (or other product) into the lower breech chute member 335, then closes the door 531. The system 10 can automatically lock the door 531 and initiates the compression cycle using the compression assembly 300*a* and the pushing cycle. The pusher head 20*h* pushes whole muscle out of the chutes 30, 60. The clipper 90 applies clips and the clipped product is held on discharge conveyor or table 99. Once the pusher head clears the chute 30, the door 531 is unlocked and opened, ready for an operator to reload the next set of whole muscle meat pieces or other product in cavity 335*c*.

It is noted that a pusher blocking gate is not required, particularly with the electric motor driven pusher system. In addition, the breech loading door 531 closure can be manual or automatic. In some embodiments, an operator can manually close the breech door and the system controller 18 can then automatically lock the door. In some embodiments, the system controller 18 can be configured to use the servo-drive's safe-off function (a safety function which prevents torque producing current to the motor), to then initiate either or both the compression and/or the pushing cycle. Thus, in embodiments without the safety gate that use a servo-motor 310 and/or 120, when the breech loading door is unlocked, the servo-drive can be disabled and the safe-off function is activated (to prevent torque producing current in the motor).

In some embodiments, the system 10 can have a multi-portion operational mode where the operator loads product, the compression cycle occurs, then the pusher 20*h* extends to push the product clear of the breech 30 then retracts, lifts and locks the upper member 331 in a home position, and opens the door 531 to allow access to the lower breech member 335 allowing the operator to load another product portion. When the desired number of portions have been loaded, the pusher 20*h* extends fully through the breech chute 30 and product chute 60 and then the clipper 90 applies one or more clips. Thus, in the multi-portion mode, the product can be pushed all the way to the end of the chute 60 or just pushed far enough to clear the breech 30. The clip cycle is typically not activated until the pusher extends fully after the final portion is loaded. An operator can indicate to the HMI and/or controller 18 that all (or the final) partial portions have been loaded or a preset number of partial load cycles can be input or selected for automatic operation of the partial and full push cycle extensions. The electric motor 120 (preferably servo-motor 120*s*) drive system and/or motor 310*s* of the compression system 300 can provide better control over pneumatic systems in multi-portion mode.

Figure 11:
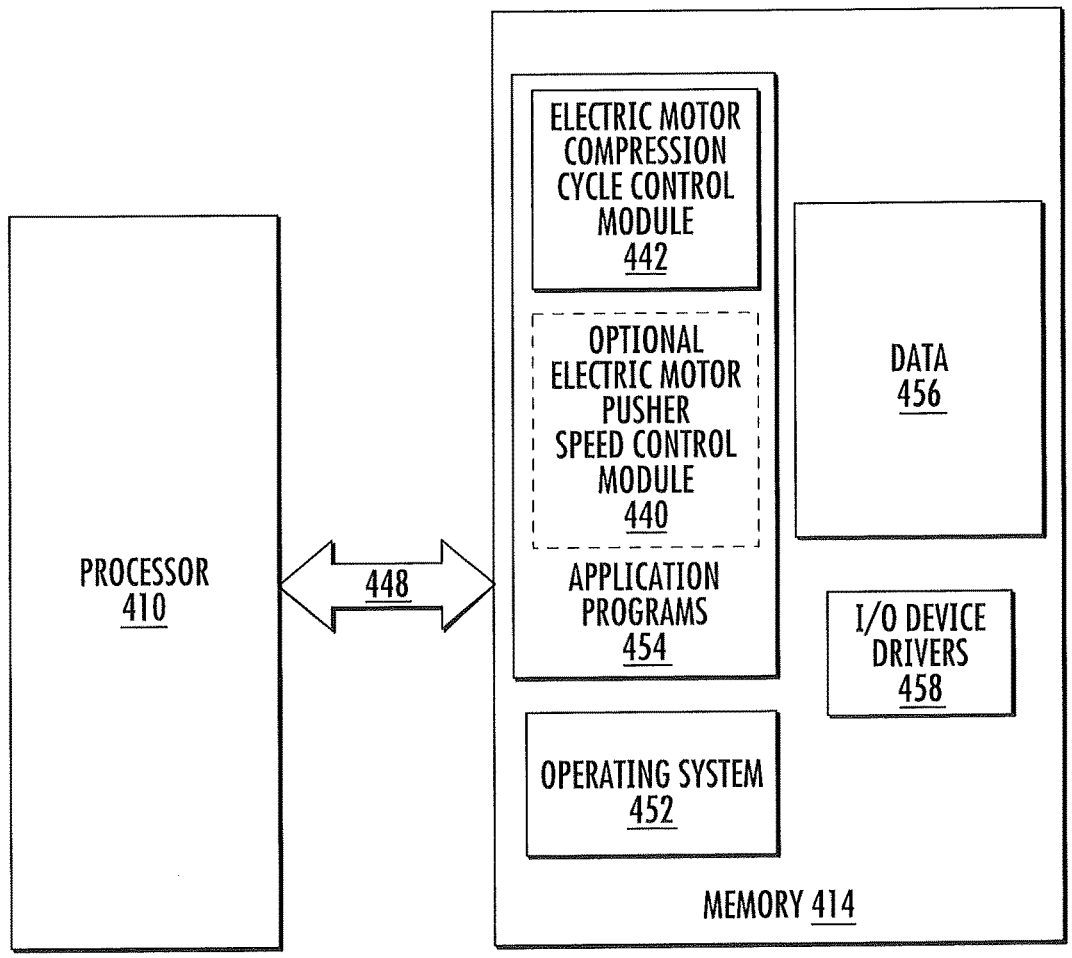
FIG. 11 is a block diagram of data processing system/computer program according to embodiments of the present invention.

FIG. 11 is a block diagram of exemplary embodiments of data processing systems that illustrate systems, methods, and computer program products in accordance with embodiments of the present invention. The data processing systems may be incorporated in a programmable logic controller and/or digital signal processor in communication with the HMI. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 11, the memory 414 may include several categories of software and data used in the data processing system: the operating system 452; the application programs 454; the input/output (I/O) device drivers 458; Electric Motor Controlled Compression Cycle Control Module 442 (for motor 310) which may be in communication with the data 456 and an optional Electric Drive Control Module 440 (for electric motor 120). The Control Module 442 can be configured to allow for different speeds to be used along different portions of the compression stroke cycle (e.g., fast and/or full speed reverse, adjustable forward speeds). The Electric Motor Control Modules 440, 442 may direct a respective servo-motor 120*s*, 310*s*.

The data 456 may include a look-up chart of different products (e.g., a "recipe" driven menu of operational parameters), covering material, proximity sensor feedback, cavity size (vertical movement), pressure data, safety interlock circuits and the like corresponding to particular or target products for one or more producers, which may allow additional force to cut the gathered material and/or time the cutting to a desired cycle for a shift and/or production run and the like.

As will be appreciated by those of skill in the art, the operating system 452 may be any operating system suitable for use with a data processing system, such as Rockwell Automation Logix, Siemens Simatic, Mitsubishi PLC operating system or any PLC operating system, OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Module 440, 442 being an application program in FIG. 11, as will be appreciated by those of skill in the art, other configurations may also be utilized while still benefiting from the teachings of the present invention. For example, the Module 440, 442 may also be incorporated into the operating system 452, the I/O device drivers 458 or other such logical division of the data processing system. Thus, the present invention should not be construed as limited to the configurations of FIG. 11 which is intended to encompass any configuration capable of carrying out the operations described herein. Further, the Module 440 can be used to operate other apparatus that may employ other chutes with or without automated pushers.

The I/O data port can be used to transfer information between the data processing system, the product pusher, the clipper to another computer system or a network (e.g., the Internet) or to other devices controlled by the processor. These components may be conventional components such as those used in many conventional data processing systems which may be configured in accordance with the present invention to operate as described herein.

The Module 442 can be configured to monitor at least one signal from a sensor associated with the door 531 and a sensor associated with a position of the upper breech member 331 to allow for loading of product into the product chamber when the ceiling is above the lower member 335 and automatically direct an actuator to move the ceiling to an operative position after signal data confirms that the door is closed.

The Module 442 can communicate with a another local, remote and/or on-board module to (or may itself be configured to) adjust speeds and/or automatically lock and unlock a lock operatively associated with the door, e.g., directing the lock to unlock in the loading configuration to allow a user to open the door for loading after the product pusher is retracted and the ceiling/compression member 331 is in a locked home position above the lower cooperating breech chute member 335.

While the present invention is illustrated, for example, with reference to particular divisions of programs, functions and memories, the present invention should not be construed as limited to such logical divisions. Thus, the present invention should not be construed as limited to the configuration of FIG. 11 but is intended to encompass any configuration capable of carrying out the operations described herein.

The flowcharts and block diagrams of certain of the figures herein illustrate the architecture, functionality, and operation of possible implementations of safety and/or diagnostic systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A packaging system, comprising:
   a frame supported by a floor;
   a single lower breech chute member attached to the frame to be held at a fixed longitudinal position relative to the frame, the lower breech chute member having an elongate axially extending arcuate cavity;
   an electric motor attached to the frame and residing above the lower breech chute member; and
   an upper breech chute member with an elongate axially extending arcuate cavity in communication with the electric motor, wherein the upper breech chute is a breech press configured to controllably travel from a lockable home position above the lower breech chute member to at least one lower operative position to engage the lower breech chute member and define a substantially cylindrical enclosed chamber of a substantially fixed diameter.

2. The packaging system of claim 1, wherein the electric motor is a servo-motor in communication with an actuator, and wherein the actuator is attached to a linkage assembly that is attached to the upper breech chute member.

3. The system of claim 2, further comprising a computer program product, the computer program product comprising:
   a non-transitory computer readable storage medium having computer readable program code embodied in said medium, said computer-readable program code comprising:
   computer readable program code that directs the servo-motor to drive an actuation rod attached to the linkage assembly to move the upper breech chute through an adjustable compression stroke cycle, wherein the adjustable compression stroke cycle can adjust acceleration, speed and timing of speed change or acceleration over a respective stroke cycle.

4. The packaging system of claim 1, wherein the system further comprises a controller configured to define an adjustable speed and/or acceleration profile of a stroke cycle of the upper breech chute member and the pusher assembly.

5. The packaging system of claim 1, wherein the electric motor is a servo-motor, the system further comprising:
a pair of scissor linkages with upper and lower linkages, the upper linkages having upper end portions that are pivotably attached to an upper portion of the frame, the lower linkages having lower end portions that are pivotably attached to the upper breech chute member, and with lower end portions of the upper linkages pivotably attached to upper end portions of the lower linkages;
a laterally extending rod attached to the scissor linkages; and
an actuation rod driven by and extending outward from the electric motor with a front end portion attached to the laterally extending rod.

6. A packaging system, comprising:
a frame supported by a floor;
a lower breech chute member attached to the frame, the lower breech chute member having an elongate axially extending arcuate cavity;
an electric motor attached to the frame and residing above the lower breech chute member;
an upper breech chute member with an elongate axially extending arcuate cavity in communication with the electric motor, wherein the upper breech chute is a breech press configured to controllably travel from a lockable home position above the lower breech chute member to at least one lower operative position to engage the lower breech chute member and define a substantially cylindrical enclosed chamber of a substantially fixed diameter;
at least one vertically extending rail residing above the lower breech chute member; and
at least one guide member attached to the upper breech chute member configured to engage the rail to thereby guide the upper member up and down between home and operative positions.

7. The packaging system of claim 6, wherein the at least one vertically extending rail comprises first and second longitudinally spaced apart rails, one residing proximate each opposing longitudinally spaced apart end portion of the lower breech chute member.

8. The packaging system of claim 6, further comprising first and second roller assemblies configured to travel against a respective rail as the upper breech chute member travels up and down.

9. The packaging system of claim 8, wherein the roller assemblies include food grade rollers.

10. The packaging system of claim 9, wherein the rollers are "V" shaped rollers.

11. The packaging system of claim 8, wherein the roller assemblies include pairs of spaced apart rollers that face each other across a width of the rail and cooperate to travel up and down a respective rail in concert.

12. A packaging system, comprising:
a frame supported by a floor;
a lower breech chute member attached to the frame, the lower breech chute member having an elongate axially extending arcuate cavity;
an electric motor attached to the frame and residing above the lower breech chute member; and
an upper breech chute member with an elongate axially extending arcuate cavity in communication with the electric motor, wherein the upper breech chute is a breech press configured to controllably travel from a lockable home position above the lower breech chute member to at least one lower operative position to engage the lower breech chute member and define a substantially cylindrical enclosed chamber of a substantially fixed diameter,
wherein the upper breech chute member is releasably attached to a mounting plate, and wherein the lower breech chute is releasably attached to the frame to lock and unlock in position with a front lock attached to the frame and a pair of mounting members with internally facing lips that slidably engage opposing end portions of the lower breech member chute, wherein the mounting plate and frame are configured to respectively interchangeably accept different pairs of upper and lower breech chute members to define different fixed diameter size enclosed breech cavities to produce different fixed diameter size products.

13. The packaging system of claim 12, wherein the mounting plate comprises first and second longitudinally spaced apart release mounts extending downward that are releasably attached to a medially positioned, longitudinally extending segment of the upper breech chute member and a pair of longitudinally spaced apart bearing mounts attached to the mounting plate and extending above the mounting plate.

14. The packaging system of claim 13, further comprising a pair of scissor linkages with respective upper and lower linkages, the upper linkages having upper end portions that are pivotably attached to an upper portion of the frame, the lower linkages having lower end portions that are pivotably attached to the bearing mounts of the mounting plate, and with lower end portions of the upper linkages pivotably attached to upper end portions of the lower linkages;
a laterally extending rod attached to the scissor linkages; and
an actuation rod extending outward from the electric motor with a front end portion attached to the laterally extending rod.

15. A method of compressing target food product, comprising:
providing a package ins s stem with an us ser breech chute member and a single cooperating lower breech chute member that remains in a fixed longitudinal position during operation once attached to a frame of the packaging system;
electronically directing an electric motor to move the upper breech chute member vertically straight downward from a detached position above and spaced apart from the cooperating lower breech chute member to engage the lower breech chute member; then
automatically compressing target food product in the enclosed cavity using the upper breech chute member controlled by the electric drive motor to form a substantially cylindrical compressed target food product in an enclosed cavity between the upper and lower breech members.

16. The method of claim 15, wherein the electric drive motor of the upper breech member is a servo-motor, the method further comprising programmatically adjusting a speed profile associated with the servo-motor, and wherein the upper and lower breech chute members attach together to define a food-grade cleanliness cylindrical cavity.

17. The method of claim 15, wherein the electric drive motor is attached to an elongate actuation rod that extends outward therefrom, the actuation rod having an end portion attached to a linkage assembly, the linkage assembly attached to the upper breech chute member, wherein the electronically directing step is carried out by the electric motor extending the actuation rod to extend links of the linkage assembly that lower the upper breech chute member.

18. The method of claim 15, further comprising programmatically directing the upper chute member to travel down to over compress the target product in the enclosed cavity beyond a round shape, then reducing pressure to form a fixed diameter cylindrical product before advancing the pusher shaft, wherein the target product is uncooked whole boneless loins.

19. The method of claim 15, wherein the target product is uncooked whole boneless beef loins and compressing step can apply between about 10,000 lbf to about 14,000 lbf.

20. A method of compressing target food product, comprising:

electronically directing an electric motor to move an upper breech chute member vertically straight downward from a detached position above and spaced apart from a cooperating lower breech chute member to engage the lower breech chute member; then automatically compressing target food product in the enclosed cavity using the upper breech chute member controlled by the electric drive motor to form a substantially cylindrical compressed target food product in an enclosed cavity between the upper and lower breech members, wherein the upper breech chute member is attached to first and second spaced apart guide assemblies that travel about vertical rails, the method further comprising guiding the straight downward movement of the upper breech chute member using the rails.

* * * * *

UNITED STATES PATENT AND TRADEMARK OFFICE
CERTIFICATE OF CORRECTION

PATENT NO. : 9,596,865 B2  Page 1 of 1
APPLICATION NO. : 14/189092
DATED : March 21, 2017
INVENTOR(S) : D. J. May et al.

It is certified that error appears in the above-identified patent and that said Letters Patent is hereby corrected as shown below:

In the Claims

| Column | Line | Error |
|---|---|---|
| 22 (Claim 15, Line 3) | 43 | "providing a package ins s stem with an us ser breech chute" should read --providing a packaging system with an upper breech chute-- |

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*